United States Patent
Leone et al.

(10) Patent No.: US 10,690,176 B2
(45) Date of Patent: Jun. 23, 2020

(54) SYSTEM FOR PISTON COOLING

(71) Applicant: Ford Global Technologies, LLC, Dearborn, MI (US)

(72) Inventors: Thomas G. Leone, Ypsilanti, MI (US); Jeffrey Eliot Chottiner, Farmington Hills, MI (US); Rick L. Williams, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1257 days.

(21) Appl. No.: 14/688,800

(22) Filed: Apr. 16, 2015

(65) Prior Publication Data
US 2016/0305363 A1 Oct. 20, 2016

(51) Int. Cl.
*F16C 7/02* (2006.01)
*F02F 1/18* (2006.01)
*F16C 9/04* (2006.01)
*F16C 3/14* (2006.01)

(52) U.S. Cl.
CPC ............... *F16C 7/023* (2013.01); *F02F 1/18* (2013.01); *F16C 3/14* (2013.01); *F16C 9/04* (2013.01); *F16C 2360/22* (2013.01)

(58) Field of Classification Search
CPC combination set(s) only.
See application file for complete search history.

(56) References Cited

U.S. PATENT DOCUMENTS

| 2,456,668 | A |   | 12/1948 | Anderson |   |
|---|---|---|---|---|---|
| 4,398,507 | A |   | 8/1983 | Belsanti |   |
| 4,567,815 | A |   | 2/1986 | Kocher |   |
| 4,697,498 | A |   | 10/1987 | Yoshikawa et al. |   |
| 4,928,550 | A | * | 5/1990 | Sakai | F16C 3/14 74/595 |
| 5,046,930 | A | * | 9/1991 | Lindstrom | F04B 39/0246 184/6.18 |

(Continued)

FOREIGN PATENT DOCUMENTS

| CN | 102242667 A | 11/2011 |
|---|---|---|
| GB | 2431219 A | 4/2007 |

(Continued)

OTHER PUBLICATIONS

Leone, T. et al., "Systems and Methods for Piston Cooling," U.S. Appl. No. 14/688,754, filed Apr. 16, 2015, 54 pages.

(Continued)

*Primary Examiner* — Stephen K Cronin
*Assistant Examiner* — Ruben Picon-Feliciano
(74) *Attorney, Agent, or Firm* — Geoffrey Brumbaugh; McCoy Russell LLP

(57) ABSTRACT

Systems and methods are provided for cooling a piston arranged within a cylinder of an engine. Oil received from a connecting rod bearing and crank journal interface may be continuously transferred via an internal conduit in a connecting rod coupled to the piston wherein the internal conduit is formed within a hollow flange of the connecting rod. The oil may then be sprayed in a continuous manner via an external nozzle to an underside of the piston, enabling continuous piston cooling as the piston travels from a top-dead-center (TDC) position to a bottom-dead-center position (BDC) and back.

20 Claims, 11 Drawing Sheets

(56) References Cited

U.S. PATENT DOCUMENTS

| | | | |
|---|---|---|---|
| 5,146,879 A * | 9/1992 | Kume | F01M 1/06 |
| | | | 123/48 B |
| 5,152,373 A * | 10/1992 | Callies | F01M 1/06 |
| | | | 123/196 R |
| 5,469,777 A * | 11/1995 | Rao | F02F 3/105 |
| | | | 123/193.6 |
| 5,533,472 A | 7/1996 | Sands et al. | |
| 5,669,285 A * | 9/1997 | Wiczynski | F02F 3/0015 |
| | | | 184/24 |
| 5,819,692 A | 10/1998 | Schafer | |
| 6,250,275 B1 | 6/2001 | Bock et al. | |
| 6,298,810 B1 | 10/2001 | Chimonides et al. | |
| 6,481,389 B2 | 11/2002 | Suzuki et al. | |
| 6,907,848 B2 | 6/2005 | Beardmore | |
| 6,955,142 B2 | 10/2005 | Patel et al. | |
| 7,753,024 B2 | 7/2010 | Hausler et al. | |
| 7,866,295 B2 | 1/2011 | Shi et al. | |
| 7,975,806 B2 | 7/2011 | Glass | |
| 8,065,985 B2 | 11/2011 | Schneider | |
| 8,695,559 B2 | 4/2014 | Bohm | |
| 2003/0037668 A1 | 2/2003 | Nastasi | |
| 2005/0076858 A1 * | 4/2005 | Beardmore | F01M 1/06 |
| | | | 123/41.38 |
| 2008/0271597 A1 * | 11/2008 | Soul | F01M 1/06 |
| | | | 92/181 R |
| 2014/0020648 A1 | 1/2014 | Azevedo et al. | |
| 2015/0047581 A1 | 2/2015 | D'Epiro | |

FOREIGN PATENT DOCUMENTS

| | | |
|---|---|---|
| JP | H03168317 A | 7/1991 |
| JP | 2003301744 A | 10/2003 |
| JP | 2014088844 A | 5/2014 |

OTHER PUBLICATIONS

China National Intellectual Property Administration, Office Action and Search Report Issued in Application No. 201610237911.5, dated Jul. 16, 2019, 11 pages. (Submitted with Partial Translation).

* cited by examiner

SYSTEM FOR PISTON COOLING

FIELD

The present disclosure relates to cooling a piston arranged within a cylinder of an internal combustion engine.

BACKGROUND AND SUMMARY

Combustion temperatures encountered within cylinders of an internal combustion engine can lead to overheating of the cylinders as well as pistons arranged within the cylinders. A lubrication system may be used to cool the pistons by squirting oil towards the pistons.

For example, pistons may be cooled via piston cooling jets wherein oil is sprayed at an underside of the piston. An example piston cooling assembly is described by Chimonides et al. in U.S. Pat. No. 6,298,810 wherein an oil nozzle is located on an engine block to supply oil to the underside of the piston. The inventors herein have recognized potential issues with piston cooling via piston cooling jets. For example, piston cooling jets may be operated in a continuous manner, such that cooling oil is constantly sprayed from the oil nozzle. As such, a larger proportion of the oil may be sprayed without cooling the piston due to the reciprocating motion of the piston. For example, a significant portion of the cooling oil may not reach the piston when the piston is at top dead center position in the cylinder. Thus, larger amounts of oil may be sprayed towards the piston to effectively cool the piston. Accordingly, oil pumps may be sized to pump larger volumes of oil towards the piston. Herein, larger sized oil pumps can increase power consumption and therefore, reduce engine efficiency.

The inventors herein have recognized the above issues and developed an approach to at least partly address the above issues. In one example approach, a method may comprise delivering oil to an underside of a piston arranged within a cylinder of an engine via an internal passage in a connecting rod of the piston, the internal passage fluidically coupled at a first end to an external nozzle, the external nozzle located below a wrist pin bore of the connecting rod. In this way, the piston may be cooled continuously.

In another example, a system may comprise an engine including a cylinder, a piston reciprocating within the cylinder, a connecting rod coupling the piston to a crankshaft, a first end of the connecting rod including a first bore coupled to a crank pin of the crankshaft via a connecting rod bearing, a second end of the connecting rod including a second bore coupled to the piston via a wrist pin, a beam of the connecting rod spanning a distance from the first end of the connecting rod to the second end of the connecting rod, the beam comprising a web section, a first flange, and a second flange, wherein each of the first flange and the second flange are hollow, an internal groove formed on a portion of an inside circumference of the first bore, the internal groove adapted to receive oil from an oil hole on the connecting rod bearing, a first passage within the first flange fluidically coupling the internal groove with a first nozzle, the first nozzle arranged at the second end of the connecting rod, and a second passage within the second flange fluidically coupling the internal groove with a second nozzle, the second nozzle arranged at the second end of the connecting rod away from the first nozzle.

In this way, a piston of a cylinder in an internal combustion engine may be cooled effectively with less waste of pressurized oil. By delivering oil to the underside of the piston in a continuous manner, the piston may be cooled throughout its travel within the cylinder. As such, a likelihood of piston degradation may be diminished. Further, since the piston is cooled via oil received from the connecting rod bearing, the oil pump may be downsized enabling a technical effect of a reduction in power consumption. Overall, engine operation may be enhanced and engine performance may be improved.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

DETAILED DESCRIPTION

Figure 1:
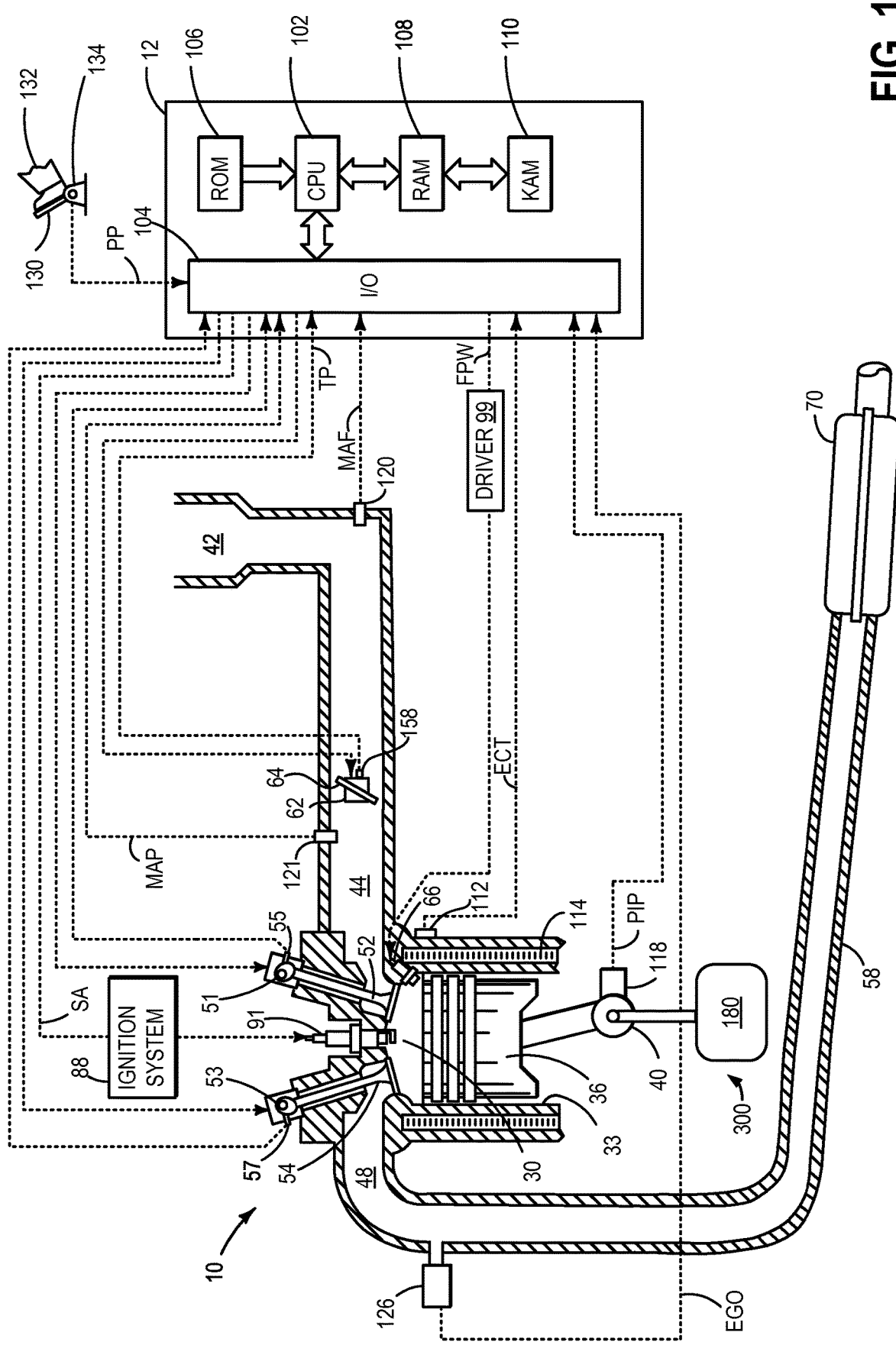
FIG. 1 shows a schematic diagram of an example cylinder within an engine.
Figure 2:
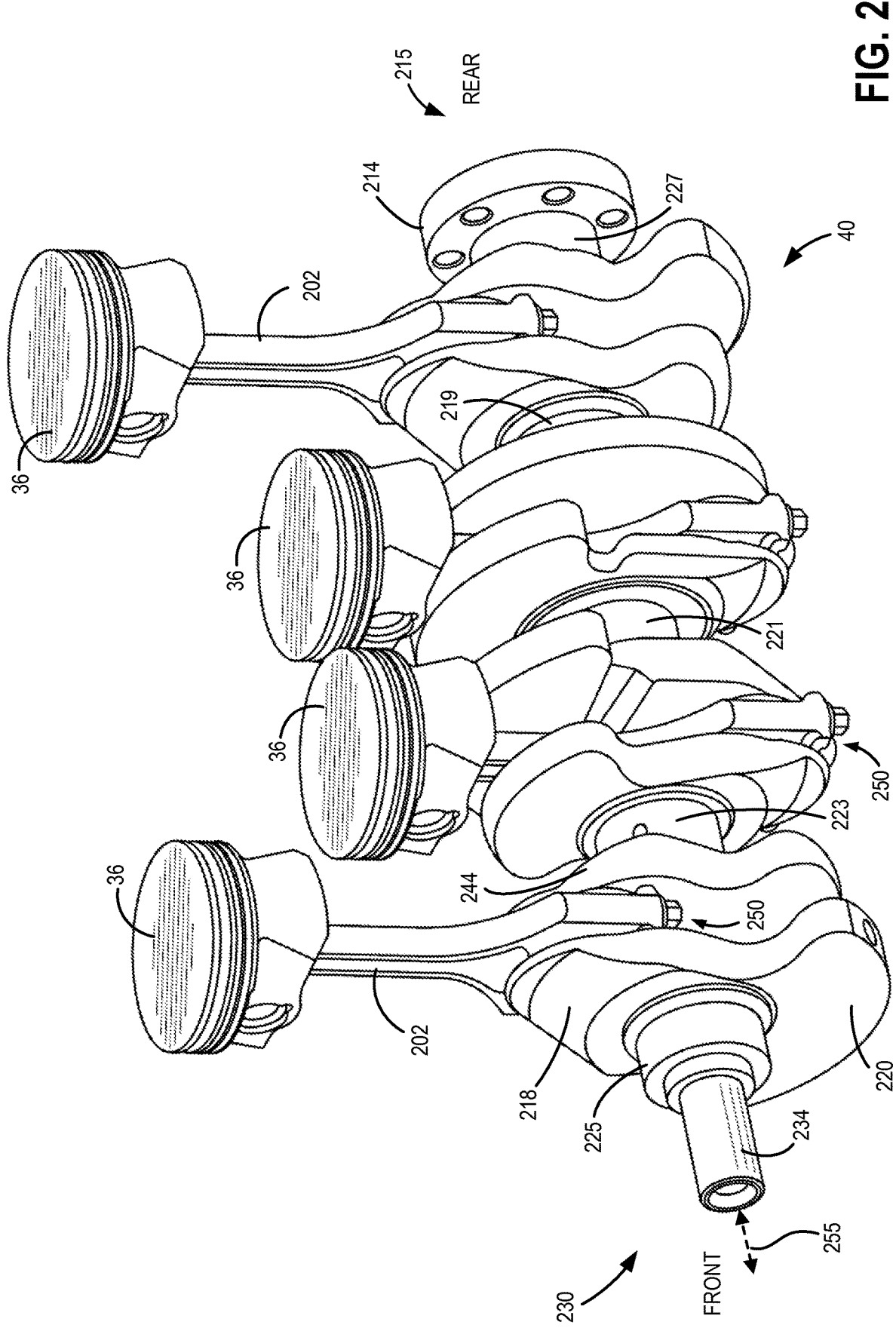
FIG. 2 depicts a perspective view of a crankshaft coupled to pistons via connecting rods in a four-cylinder engine.
Figure 3:
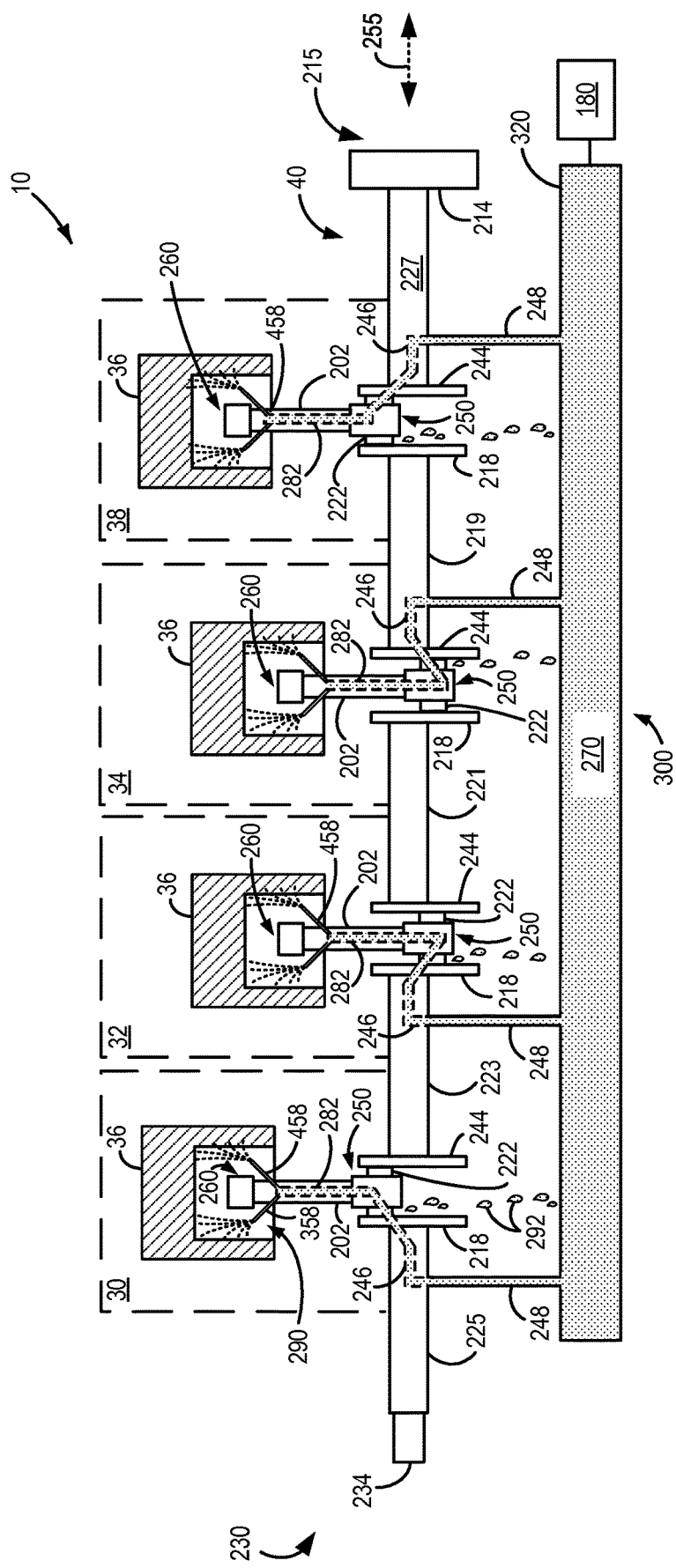
FIG. 3 is a schematic depiction of piston cooling in an engine, such as the engine of FIG. 1, in accordance with a first embodiment of the present disclosure.
Figure 4:
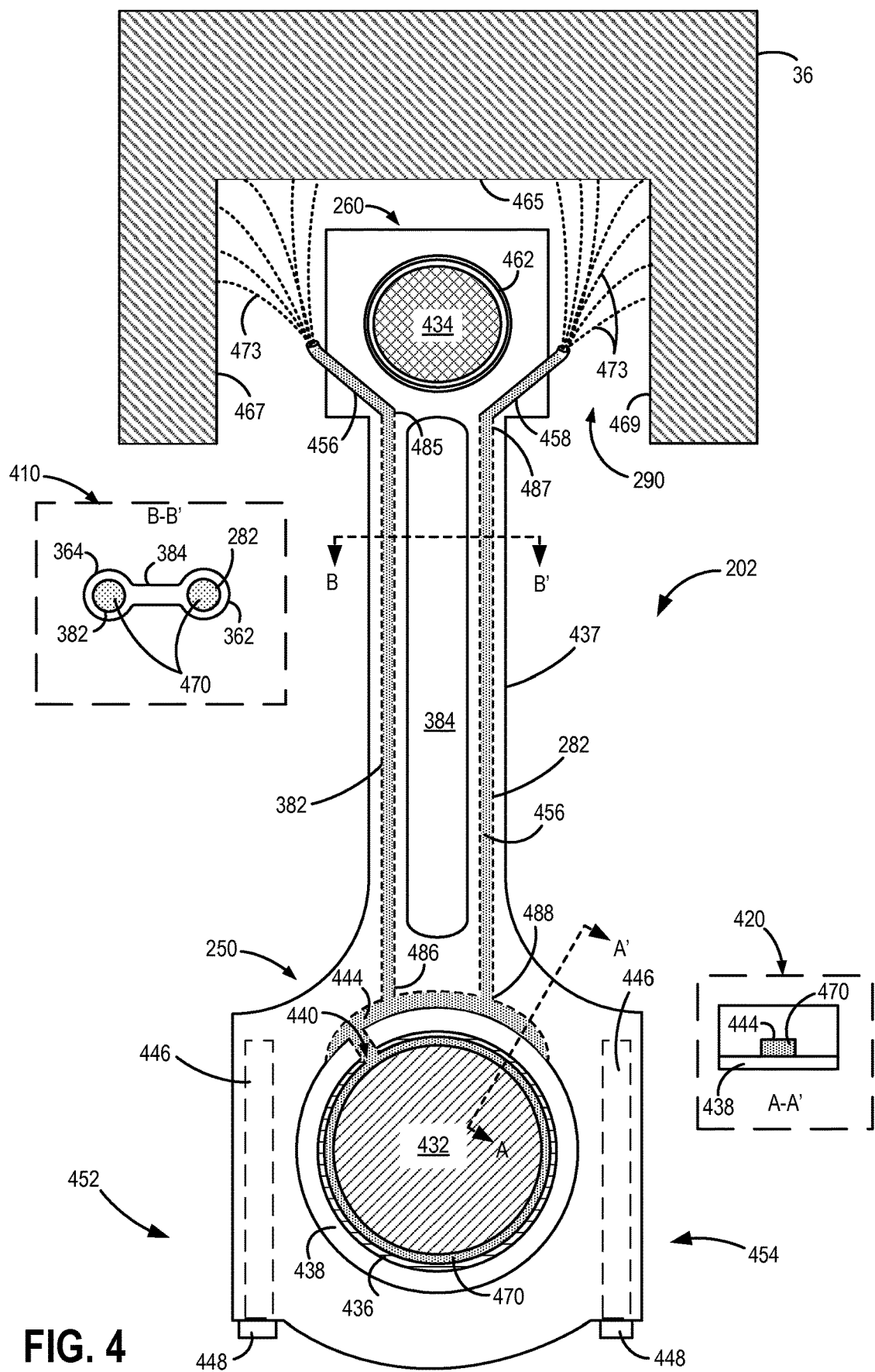
FIG. 4 portrays schematically a single connecting rod and an associated piston in the first embodiment of the present disclosure.
Figure 5:
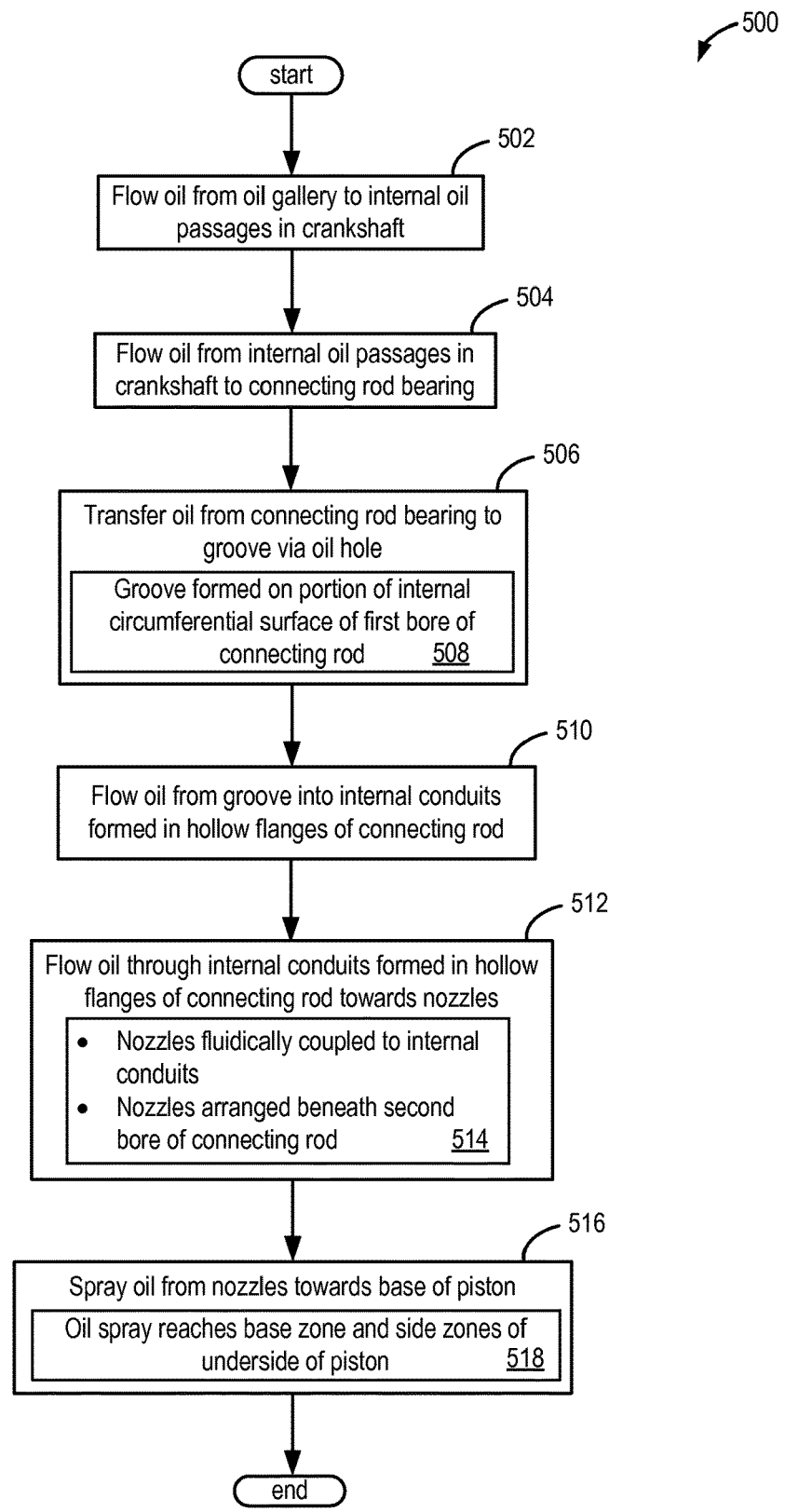
FIG. 5 is an example flowchart illustrating oil flow to the piston in the first embodiment of the present disclosure.
Figure 6:
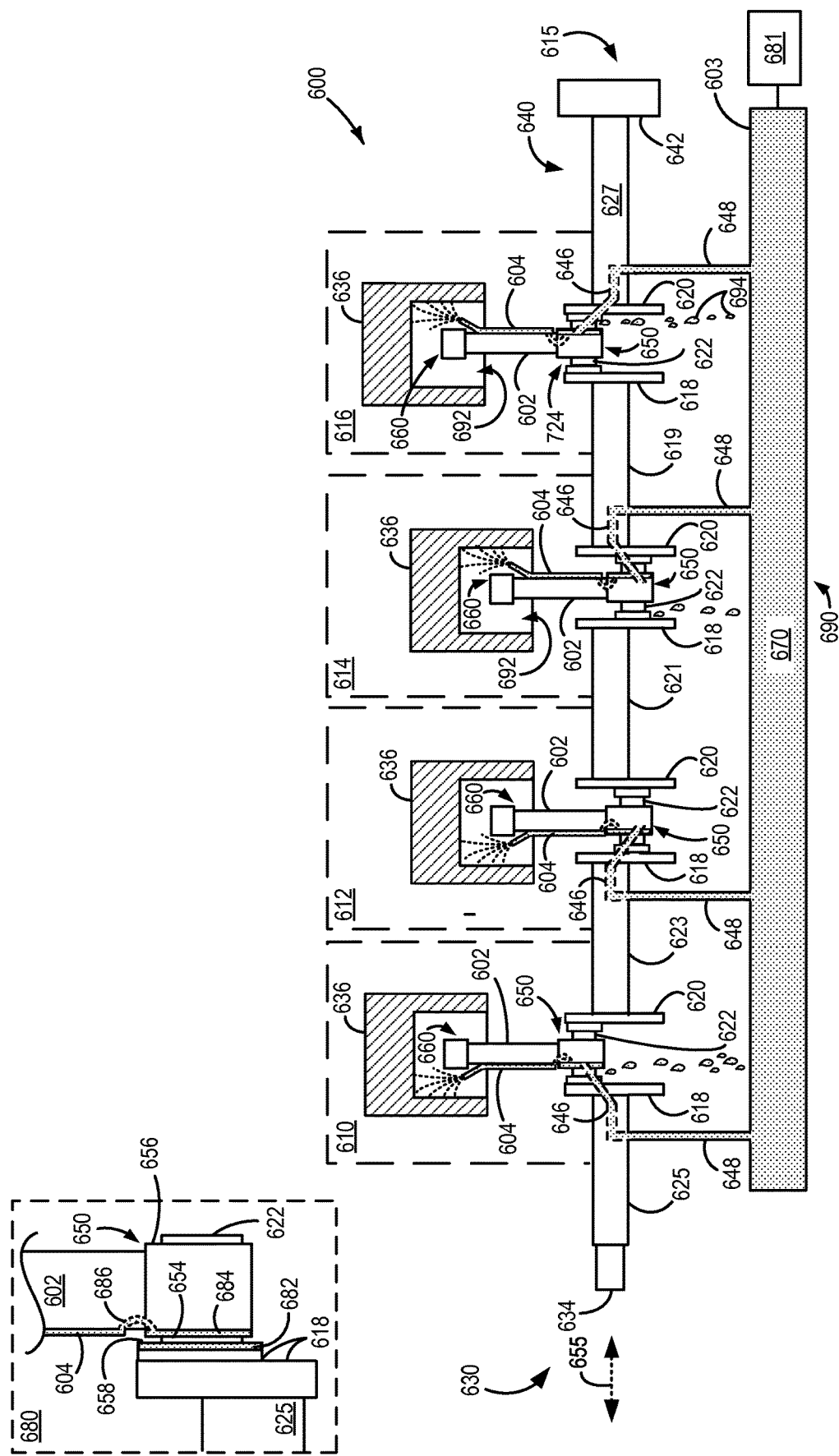
FIG. 6 is a schematic depiction of piston cooling in an engine, in accordance with a second embodiment of the present disclosure.
Figure 7:
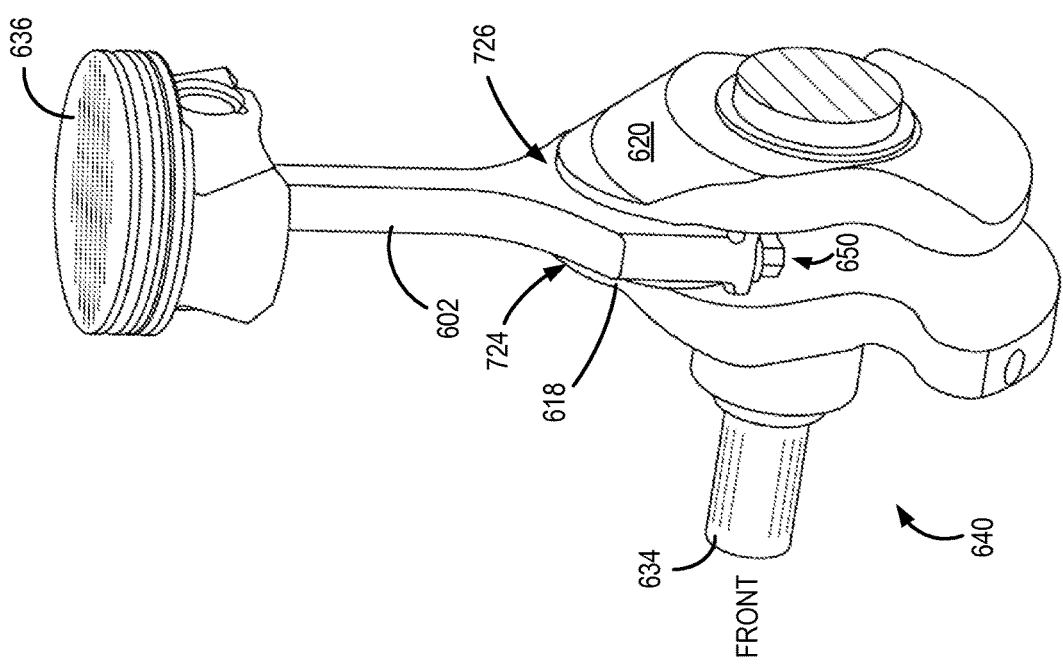
FIG. 7 illustrates a perspective view of a piston coupled to a crankshaft.
Figure 10:
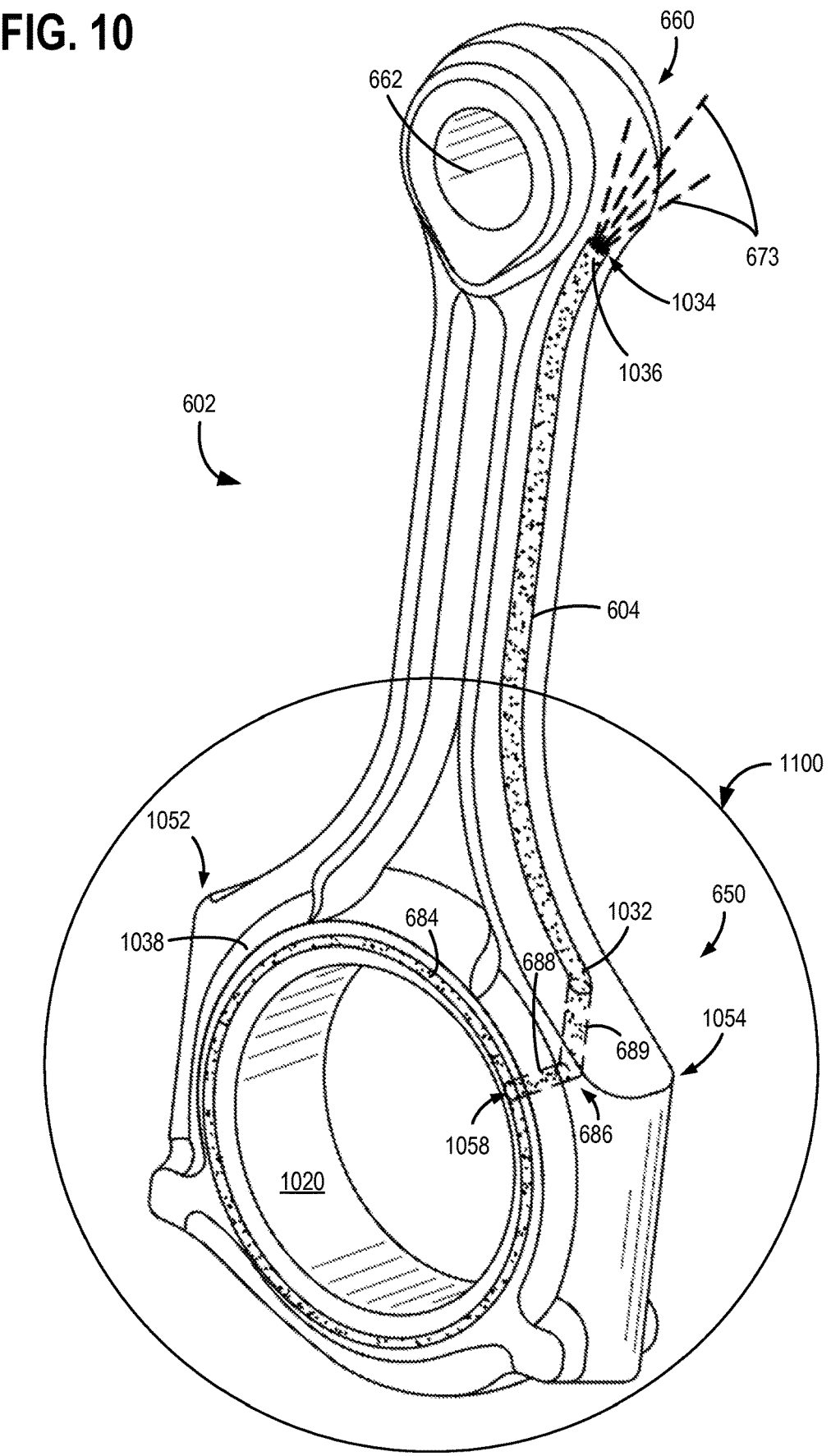
FIG. 10 is a perspective view of a connecting rod with the exterior tube arranged along a span of the connecting rod.
Figure 11:
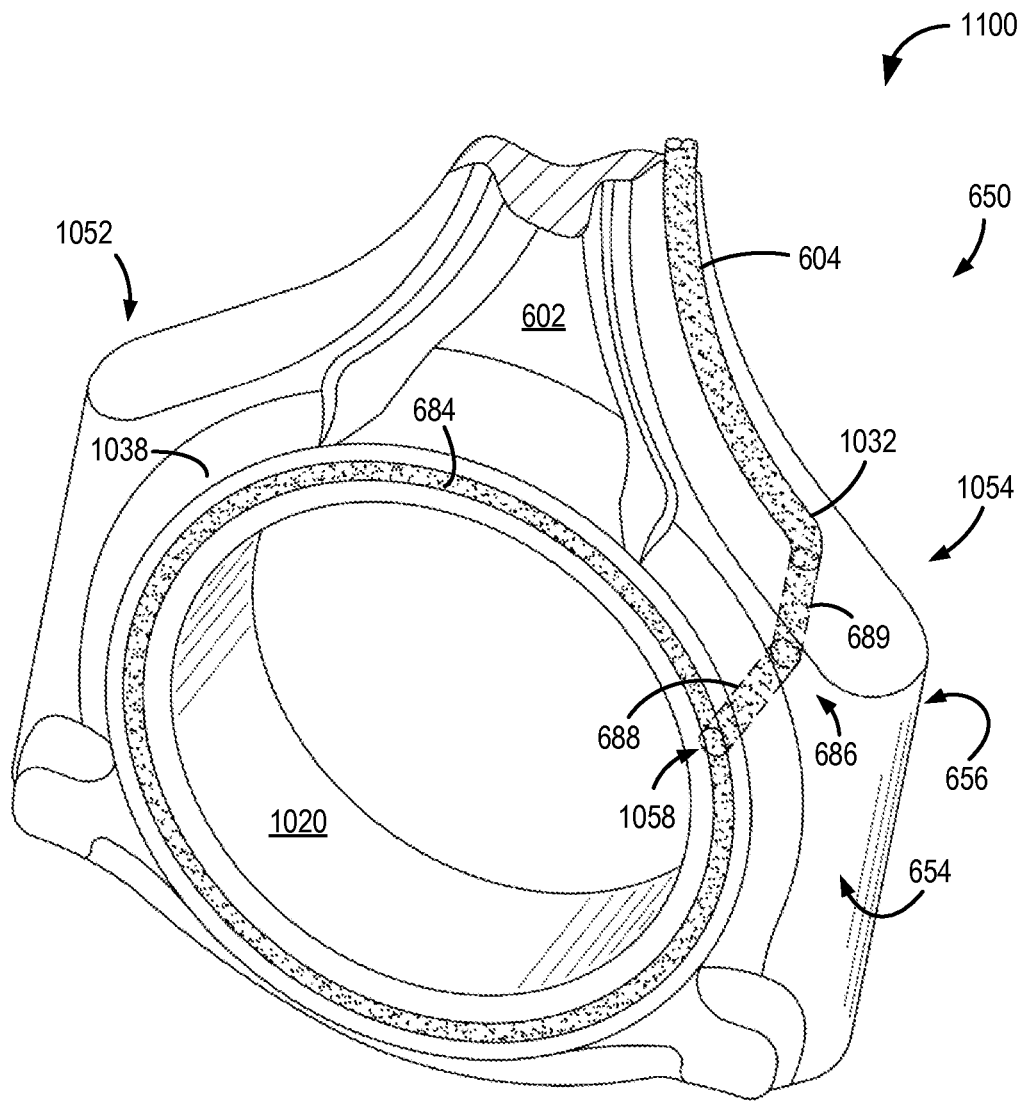
FIG. 11 is a magnified view of a first end of the connecting rod of FIG. 10 depicting an annular groove formed around a bore on the first end of a connecting rod.
Figure 12:
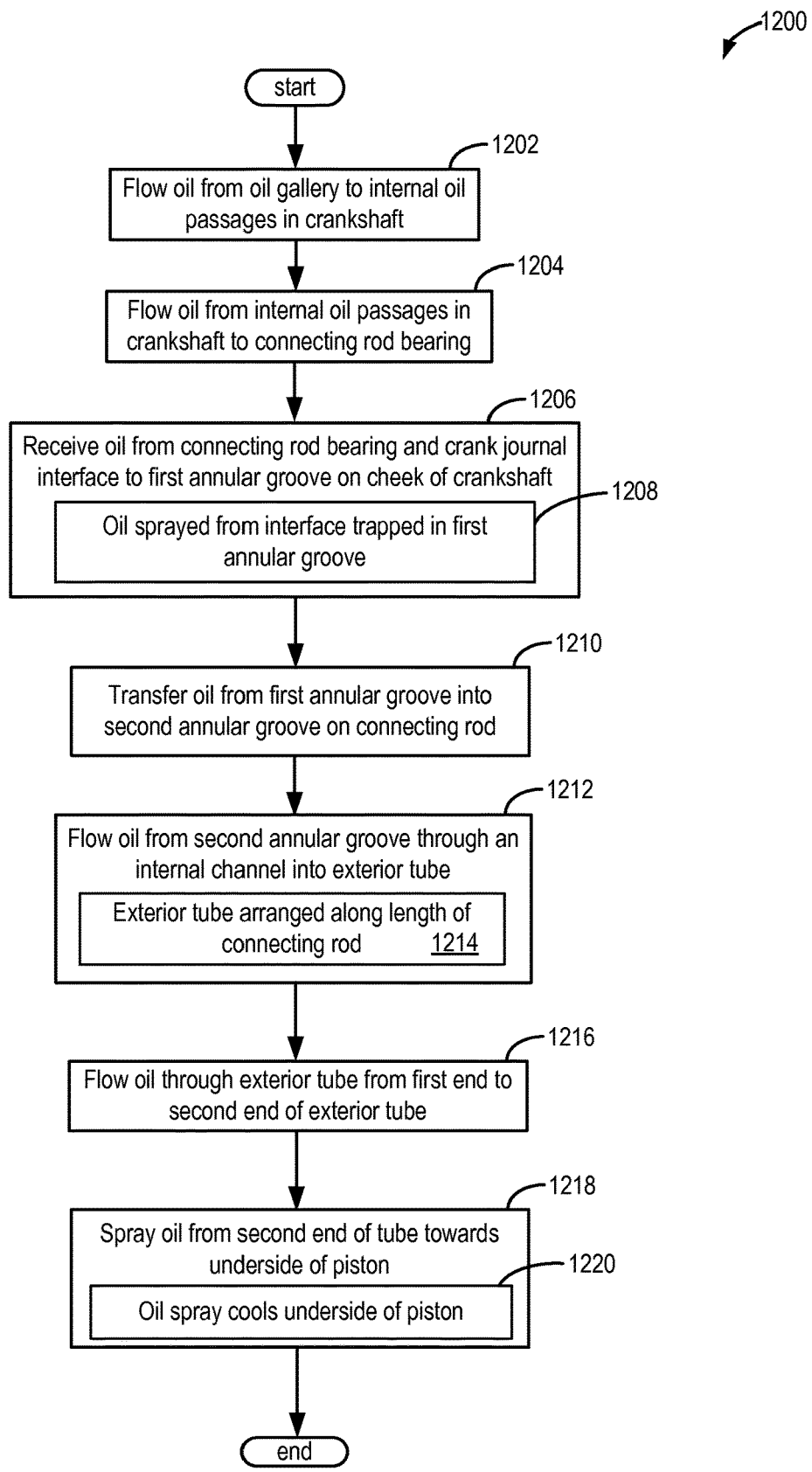
FIG. 12 is an example flowchart illustrating piston cooling via the second embodiment of the present disclosure.

The following detailed description relates to cooling a piston disposed within a cylinder of an engine in a vehicle, such as the example cylinder shown in the engine depicted in FIG. 1. The example engine may include a crankshaft coupled to the piston of the cylinder. For example, the engine may be a four-cylinder engine including four pistons coupled to the crankshaft via four respective connecting rods as shown in FIG. 2. In a first embodiment, one or more internal conduits substantially spanning a length of a corresponding connecting rod may transfer oil to cool the pistons (FIG. 3). In the first embodiment, each connecting rod may be formed to include a web, a first hollow flange, and a second hollow flange. The one or more internal conduits may be incorporated within the first hollow flange and the second hollow flange (FIG. 4). Each of the internal conduits may receive oil from a grove formed on an internal circumference of a bore at a first end of the connecting rod. The oil may be conducted via the internal conduits to a respective external nozzle arranged below a bore on a second end of the connecting rod. The external nozzle may then spray oil received via the internal conduit towards an underside of its corresponding piston (FIG. 5). A second embodiment for piston cooling is shown in FIG. 6 wherein an exterior tube is coupled to each connecting rod. The exterior tube may be coupled along a substantial length of the connecting rod (FIG. 10). The connecting rod may in turn be coupled to a piston (FIG. 7). The exterior tube receives oil from an annular groove formed around the bore at the big end of the connecting rod (FIG. 11). The annular groove at the first end of the connecting rod receives oil from an annular groove formed on a cheek of the crankshaft (FIG. 9), the cheek being adjacent to the annular groove on the first end of the connecting rod. The exterior tube conducts the oil towards a base of the piston (FIG. 8) and sprays oil towards the base of the piston (FIG. 12). In this way, the pistons of the engine may be cooled throughout their travel distance.

FIG. 1 shows a schematic depiction of an example cylinder 30 in internal combustion engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion chamber 30 (also known as, cylinder 30) of engine 10 may include combustion chamber walls 33 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust manifold 48 and exhaust passage 58. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

In the example of FIG. 1, intake valve 52 and exhaust valve 54 may be controlled by cam actuation via respective cam actuation systems 51 and 53. Cam actuation systems 51 and 53 may each include one or more cams mounted on one or more camshafts (not shown in FIG. 1) and may utilize one or more of cam profile switching (CPS), variable cam timing (VCT), variable valve timing (VVT) and/or variable valve lift (VVL) systems that may be operated by controller 12 to vary valve operation. The angular position of intake and exhaust camshafts may be determined by position sensors 55 and 57, respectively. In alternate embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 99. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Ignition system 88 can provide an ignition spark to combustion chamber 30 via spark plug 91 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Engine 10 is shown as a naturally aspirated engine. Alternatively, engine 10 may be a forced induction engine and may include a compression device such as a turbocharger or supercharger including at least a compressor arranged along intake passage 42. For a turbocharger, the compressor may be at least partially driven by an exhaust turbine (e.g., via a shaft) arranged along exhaust passage 58. The compressor may draw air from intake passage 42 to supply a boost chamber downstream of the compressor. Exhaust gases may spin the exhaust turbine which is coupled to the compressor via a shaft. For a supercharger, the compressor may be at least partially driven by the engine and/or an electric machine, and may not include an exhaust turbine. A wastegate may be coupled across the exhaust turbine in a turbocharger. Specifically, the wastegate may be included in a bypass passage coupled between an inlet and outlet of the exhaust turbine. By adjusting a position of the wastegate, an amount of boost provided by the exhaust turbine may be controlled.

Intake manifold 44 is shown communicating with throttle 62 having a throttle plate 64. In this particular example, the position of throttle plate 64 may be varied by controller 12 via a signal provided to an electric motor or actuator (not shown in FIG. 1) included with throttle 62, a configuration that is commonly referred to as electronic throttle control (ETC). Throttle position may be varied by the electric motor via a shaft. Throttle 62 may control airflow from intake boost chamber 46 to intake manifold 44 and combustion chamber 30 (and other engine cylinders). The position of throttle plate 64 may be provided to controller 12 by throttle position signal TP from throttle position sensor 158.

Exhaust gas sensor 126 is shown coupled to exhaust manifold 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 58 downstream of exhaust gas sensor 126 and exhaust turbine 92. Device 70 may be a three way catalyst (TWC), NOx trap, various other emission control devices, or combinations thereof.

An exhaust gas recirculation (EGR) system (not shown) may be used to route a desired portion of exhaust gas from exhaust passage 58 to intake manifold 44. Alternatively, a portion of combustion gases may be retained in the combustion chambers, as internal EGR, by controlling the timing of exhaust and intake valves.

Engine 10 also includes a lubrication system 300 which may be additionally used to cool various components of the engine including crankshaft 40, piston 36, and the optional turbocharger. Lubrication system 300 includes an oil pump 180, an oil sump (not shown) held within a crankcase (not shown), and at least one piston cooling assembly (not shown). The crankcase may be positioned beneath the crankshaft 40, in one example. Oil pump 180 can be coupled to crankshaft 40 to provide rotary power to operate the flow of oil via oil pump 180. In another example, oil pump 180 may be an electric pump. In alternative embodiments, the oil pump may be a variable flow oil pump. It will be appreciated that any suitable oil pump configuration may be implemented to vary the oil pressure and/or oil flow rate. In some embodiments, instead of being coupled to the crankshaft 40, the oil pump 180 may be coupled to a camshaft, or may be powered by a different power source, such as a motor or the like. The oil pump 180 may include additional components not depicted in FIG. 1, such as a hydraulic regulator, electro-hydraulic solenoid valve, etc.

Controller 12 is shown in FIG. 1 as a conventional microcomputer including: microprocessor unit 102, input/output ports 104, read-only memory 106, random access memory 108, keep alive memory 110, and a conventional data bus. Controller 12 commands various actuators such as throttle plate 64, fuel injector 66, and the like. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by vehicle operator 132; a measurement of engine manifold pressure (MAP) from pressure sensor 121 coupled to intake manifold 44; a profile ignition pickup signal (PIP) from Hall effect sensor 118 (or other type) coupled to crankshaft 40; a measurement of air mass entering the engine from mass airflow sensor 120; a measurement of throttle position from sensor 158; and air/fuel ratio (AFR) from EGO sensor 126. In a preferred aspect of the present description, crankshaft sensor 118, which may be used as an engine speed sensor, may produce a predetermined number of equally spaced pulses for every revolution of the crankshaft from which engine speed (RPM) can be determined. Such pulses may be relayed to controller 12 as a profile ignition pickup signal (PIP) as mentioned above.

Storage medium read-only memory 106 can be programmed with computer readable data representing instructions executable by processor 106 for performing various methods not specifically listed herein.

As described above, FIG. 1 merely shows one cylinder of a multi-cylinder engine, and that each cylinder has its own set of intake/exhaust valves, fuel injectors, spark plugs, etc. In one example, engine 10 may include four cylinders arranged in an inline manner. In another example, engine 10 may include six cylinders arranged in a V-configuration. Alternatively, engine 10 may include additional or fewer cylinders without departing from the scope of this disclosure.

FIG. 2 depicts a perspective view of a crankshaft coupled to a plurality of pistons via respective connecting rods. FIG. 2 is drawn to scale, although other relative dimensions may be used. FIGS. 7-11 are also drawn to scale, although other relative dimensions may be used. The crankshaft of FIG. 2 may be crankshaft 40 in engine 10 of FIG. 1. Further, the pistons in FIG. 2 may be the same as the piston depicted in FIG. 1 (e.g., piston 36). Further still, each piston of engine 10 of FIG. 2 may be similar in design and each connecting rod 202 coupled to a respective piston in engine 10 may be similar to the other connecting rods depicted in FIG. 2.

Crankshaft 40 of FIG. 2 may be utilized in a four cylinder engine having an inline configuration in which the four cylinders are aligned in a single row. Accordingly, FIG. 2 depicts four pistons 36 arranged in a single row along a length of the crankshaft 40. However, alternative cylinder configurations (such as V-6, V-12, I-6, etc.) may be included in engine 10 without departing from the scope of this disclosure.

Crankshaft 40 has a crank nose end 230 (also termed front end) with crank nose 234 for mounting pulleys and/or for installing a harmonic balancer (not shown) to reduce torsional vibration. Crankshaft 40 further includes a flange end 215 (also termed rear end) with a flange 214 configured to attach to a flywheel (not shown). The flywheel may in turn be coupled to a transmission (not shown). In this way, energy generated via combustion may be transferred from the pistons to the crankshaft and flywheel, and thereon to the transmission thereby providing motive power to a vehicle.

Crankshaft 40 may also comprise a plurality of crank pins (also termed, journals), webs (also termed, cheeks), and counterweights. In the depicted example, crankshaft 40 includes a front main bearing journal 225 and a rear main bearing journal 227. In addition to these main bearing journals at the two ends (front and rear), crankshaft 40 further includes three main bearing journals 223, 221, and 219 positioned between front main bearing journal 225 and rear main bearing journal 227. Thus, crankshaft 40 has five main bearing journals wherein each main bearing journal is aligned with a central axis of rotation 255 of crankshaft 40. Each of the main bearing journals support main bearings that are configured to enable rotation of crankshaft 40 while providing support to the crankshaft. In alternate embodiments, the crankshaft may have more or less than five main bearing journals.

A first web 218 (also termed, first cheek 218) borders a crank pin (not labeled) and a corresponding first end 250 of connecting rod 202. A second web 244 (also termed, second cheek 244), positioned opposite first cheek 218, borders the crank pin and the first end 250 of connecting rod 202 on the opposite side to first cheek 218. Though not shown, first end 250 of connecting rod 202 may be coupled to the crank pin positioned between first web 218 and second web 244. Thus, connecting rod 202 couples corresponding piston 36 to crankshaft 40. First web 218 and second web 244 may support the crank pin arranged in-between the first web 218 and the second web 244. Further, each of first web 218 and the second web 244 may be mechanically coupled to respective counterweights 220 to dampen oscillations in the crankshaft 40.

Turning now to FIG. 3, it schematically shows a first embodiment for piston cooling in engine 10. Engine 10 is depicted as a four cylinder engine including crankshaft 40 of FIG. 2. Specifically, crankshaft 40 of FIG. 3 may be the same as crankshaft 40 of FIG. 2. As such, many components depicted in FIG. 3 may be the same as those described earlier in reference to FIGS. 1 and 2. Accordingly, these components may be numbered the same and will not be re-introduced. It will also be noted that repetitive components (e.g., all external nozzles) may not be numbered throughout FIG. 3.

Each of the plurality of pistons 36 is arranged within a corresponding cylinder in engine 10 of FIG. 3. As such, engine 10 includes four cylinders: a first cylinder 30, a second cylinder 32, a third cylinder 34, and a fourth cylinder 38. As shown in FIG. 3, the four cylinders are positioned above crankshaft 40. Herein, "above" indicates a direction vertically above (relative to gravity) crankshaft 40 when engine 10 is positioned in a vehicle situated on a flat road.

Other than the main bearing journals introduced in reference to FIG. 2, crankshaft 40 also includes four crank pins, each labeled 222. The crank pins are arranged from crank nose end 230 to flange end 215. Since engine 10 is a four cylinder engine, crankshaft 40 includes four crank pins, each crank pin coupled to one of four connecting rods. Specifically, crank pins 222 may each be mechanically and pivotally coupled to respective piston connecting rods 202, and thereby, respective pistons 36. It will be appreciated that during engine operation, crankshaft 40 rotates around the central axis of rotation 255.

As described earlier, each crank pin 222 may be supported by a corresponding first web 218 and second web 244. Each of the webs (e.g., first web 218 and second web 244) may further couple each of the crank pins to the main bearing journals. To elaborate, in the example of first cylinder 30, first web 218 may couple crank pin 222 to front main bearing journal 225 whereas second web 244 may couple crank pin 222 to main bearing journal 223. Similarly, in the example of second cylinder 32, first web 218 may couple associated crank pin 222 to main bearing journal 223 while second web 244 may couple the associated crank pin 222 to main bearing journal 221.

FIG. 3 also illustrates lubrication system 300 introduced earlier in reference to FIG. 1. Lubrication system includes oil pump 180 which may be fluidically coupled to oil gallery 320. Further, oil pump 180 pumps oil from an oil sump (not shown) within a crankcase to the oil gallery 320. Oil gallery 320 supplies oil 270 under pressure to multiple components of the engine 10 including crankshaft 40, one or more camshafts and related components including rocker arms, lifters, etc., and components of a turbocharger system. Specifically, oil 270 may be delivered via passages in an engine block to multiple oil passages drilled into crankshaft 40. As shown in FIG. 3, oil 270 may be delivered to each main bearing journal of crankshaft 40 via a supplementary conduit 248. Though a single oil gallery 320 is depicted, additional oil galleries may be included.

An internal oil passage 246 is drilled within each main bearing journal and is also fluidically coupled to a corresponding supplementary conduit 248. Thus, each internal oil passage 246 receives oil via its corresponding supplementary conduit 248 from oil gallery 320. Further, each internal oil passage 246 may extend from its associated main bearing journal through a neighboring (e.g., adjacent) web of the crankshaft into a crank pin. For example, in reference to first cylinder 30, internal oil passage 246 in front main bearing journal 225 extends from front main bearing journal 225 through adjacent first web 218 into crank journal 222 associated with first cylinder 30. In another example, in reference to third cylinder 34, internal oil passage 246 receives oil from its respective supplementary conduit 248 into main bearing journal 219 and conducts the oil to adjacent crank journal 222 via adjacent second web 244. Bearings coupled to each of the main bearing journals and the crank journals may thus be lubricated. Specifically, an oil hole may be formed on each crank journal and main bearing journal to transfer oil from the internal oil passage 246 to a connecting rod bearing and/or a main bearing. As such, oil may flow through the journal into a corresponding bearing and may form an oil film between the journal and its corresponding bearing providing lubrication. Oil may be continuously forced through the various bearings of the crankshaft. Further, oil may be cast outward from each bearing as oil exits the bearing and may fall down (as shown by oil drops 292) into the oil sump (not shown) in the crankcase (not shown). It will be noted that oil containing sections such as oil gallery 320, internal passage 246, oil drops 292, etc. are shown as dotted regions.

Each embodiment described in the present disclosure traps a portion of the oil from the connecting rod bearings and/or journals of the crankshaft and transfers this portion of oil towards an underside of each piston to cool the pistons.

In the first embodiment for piston cooling shown in FIG. 3, each connecting rod 202 of engine 10 may be formed to include one or more hollow flanges. An internal conduit may be formed within each of the hollow flanges. In the depicted example, each connecting rod 202 includes two hollow flanges, each hollow flange encompassing an internal conduit. Thus, connecting rod 202 may include two internal conduits (as shown in FIG. 4). The schematic depiction of FIG. 3 shows a first internal conduit 282 within each connecting rod 202. Although a second internal conduit may be present within connecting rod 202, it is not depicted in this schematic example of FIG. 3. The first internal conduit 282 may receive oil from a connecting rod bearing. Specifically, a groove (not shown in FIG. 3) formed behind the connecting rod bearing on an internal circumference of a first bore at first end 250 of connecting rod 202 may trap oil from its associated connecting rod bearing. The first internal conduit 282, in turn, is fluidically coupled to the groove and therefore, may conduct oil from the groove towards a second end 260 of the connecting rod 202. Oil may be sprayed via external nozzle 458 fluidically coupled to the first internal conduit 282 towards an underside 290 of each piston 36. The first internal conduit 282 may be coupled to additional external nozzles. As shown in FIG. 3, the first internal conduit 282 may be fluidically coupled to two external nozzles, 458 and 358. The external nozzles may be positioned at the second end 260 of the connecting rod 202.

It will be noted that the components described above are indicated in FIG. 3 for first cylinder 30. However, each of the cylinders of FIG. 3 may comprise similar components including connecting rods with one or more internal conduits and one or more external nozzles though not specifically indicated or numbered.

As shown schematically, oil sprayed from each external nozzle (shown as dotted arcs) may be directed to underside 290 of each piston 36. Specifically, the external nozzles may be formed and positioned in a manner that enables delivery of substantial oil from an opening (or exit) of the external nozzle to a base of the piston 36. As such, oil spray may not be obstructed by any component. The oil spray may provide cooling to the piston and may eventually fall down into the oil sump in the crankcase. As such, the piston may transfer heat to the oil. Further, since oil is sprayed from each external nozzle in a continuous manner towards the underside of piston 36, the piston may be cooled continuously as it travels from top dead center (TDC) position to bottom dead center position (BDC), and back. Specifically, the piston may be cooled even when at TDC position.

Each piston 36 arranged in the four cylinders (or other number of cylinders) of engine 10 may thus be cooled by one or more internal conduits arranged within hollow flanges of an associated connecting rod.

Turning now to FIG. 4, it schematically shows a single connecting rod 202 coupled to a corresponding piston 36. Connecting rod 202 of FIG. 4 may be the same as one of the plurality of connecting rods 202 of engine 10 in FIG. 3. Similarly, piston 36 of FIG. 4 may be the same as one of the plurality of pistons coupled to crankshaft 40 in FIG. 3. Components introduced previously in FIG. 3 may be numbered similarly in FIG. 4.

Connecting rod 202 includes first end 250 formed towards a crank pin end of the connecting rod, second end 260 formed towards a piston end of the connecting rod, and beam 437. Beam 437 of the connecting rod may extend from first end 250 of the connecting rod 202 to the second end 260 of the connecting rod. In other words, the beam 437 may span a distance from the first end 250 until the second end 260 of the connecting rod 202.

The first end 250 of the connecting rod (also termed a big end) includes a bore 438 that may be coupled to a crank pin (also termed, crank journal) of the crankshaft. As such, bore 438 may surround (and be coupled to) the crank pin of the crankshaft. To elaborate, bore 438 at the first end 250 may encircle a connecting rod bearing 436 which in turn surrounds a corresponding crank journal 432 of the crankshaft (e.g., crankshaft 40 of FIGS. 2 and 3). As such, an inside circumference of bore 438 may be in face sharing contact with connecting rod bearing 436.

A film (e.g., 1-2 microns) of oil 470 may be present between connecting rod bearing 436 and crank journal 432 providing lubrication for the motion of the connecting rod and the crankshaft. As such, the oil film may be present at an interface between the connecting rod bearing 436 and crank journal 432. Thus, the oil film may reduce direct contact between the connecting rod bearing and the crank journal and may, therefore, reduce friction. As described earlier, oil to lubricate the connecting rod bearing may be received via internal oil passage 246 (shown in FIG. 3) from an adjacent main bearing journal. An oil hole (not shown) may be present in the crank journal to transfer oil from the internal oil passage 246 to the connecting rod bearing. Further, the connecting rod bearing may also include an oil hole 440. The oil hole 440 may be placed in the connecting rod bearing 436 at a location that does not significantly affect a thickness (e.g., minimum thickness) of the film of oil between the connecting rod bearing and the crank journal. Further, the location of the oil hole 440 may also be selected so that a pressure (e.g., maximum pressure) of the oil film is not significantly affected.

The first end 250 of the connecting rod 202 also includes bolts 448 fitted into bolt holes 446 at lateral edges 454 and 452 of the first end 250. Specifically, two bolts 448 may be included within respective bolt holes 446. Further, each bolt hole 446 (and corresponding bolt 448) may be positioned at a lateral edge (e.g., lateral edge 452 and lateral edge 454) of the first end (e.g., big end) of the connecting rod. As known in the art, the first end 250 of the connecting rod 202 may be separated to enable coupling of the connecting rod to the crank journal. Bolts 448 may be fitted into bolt holes 446 to couple the separated parts of the connecting rod.

Second end 260 of connecting rod 202 also includes a bore 462 encompassing a wrist pin 434. Wrist pin 434 may enable coupling between the connecting rod 202 and piston 36. A wrist pin bearing may also be included within bore 462 at second end 260 (not indicated).

Beam 437 may comprise a web 384 coupled to first flange 362 and second flange 364. To elaborate, connecting rod 202 includes beam 437 which may be formed as a web bordered by two flanges. Inset 410 is a cross sectional view of beam 437 of connecting rod 202, in a cross sectional plane along line B-B'. As shown in inset 410, web 384 of connecting rod 202 is flanked by the first flange 362 and the second flange 364. Each of first flange 362 and second flange 364 may be hollow. Further, each of the first flange 362 and the second flange 364 may be circular. By using circular flanges, the connecting rod may be made stiffer while maintaining a lower weight. As such, the hollow flanges may have thicker walls providing a desirable stiffness to the connecting rod. In an alternative embodiment, each of the first flange 362 and the second flange 364 of the connecting rod may be oblong. Other shapes of the first flange and second flange may be contemplated.

Each of the first flange 362 and the second flange 364 may include an internal conduit, e.g., first internal conduit 282 in first flange 362, to conduct oil from the first end 250 towards the second end 260 of the connecting rod. Specifically, first flange 362 includes first internal conduit 282 while second flange includes second internal conduit 382. Each of the internal conduits are depicted in inset 410 with oil 470 (dotted area) within.

The connecting rod, in one example, may be forged with hollow flanges. In another example, the connecting rod may be formed by powder metallurgy techniques to incorporate the hollow flanges. In yet another example, each of the internal conduits may be drilled into the connecting rod.

Each of the internal conduits within the hollow flanges of the connecting rod may be fluidically coupled to a groove 444 formed on an inside circumference of bore 438 at first end 250 of connecting rod 202. An example of the inside circumference 1020 of bore 438 (bore labeled 1038 in FIG. 10) is shown in FIG. 10. Groove 444 may be formed on a portion of the inside circumference of bore 438. To elaborate, groove 444 may not be formed on an entire inside circumference of bore 438. Further, groove 444 may be formed to receive oil from oil hole 440 of connecting rod bearing 436. As such, groove 444 may be fluidically coupled to oil hole 440 of connecting rod bearing 436. It will also be appreciated that groove 444 may be formed away from (e.g., at a distance from) each of the bolt holes 446.

Inset 420 is a cross sectional view through groove 444 at first end 250 of connecting rod 202, in a cross sectional plane along line A-A'. Inset 420 shows groove 444 including oil 470 and bordered at its bottom side by bore 438. Groove 444 is otherwise surrounded by a portion of first end 250 of connecting rod 202. As such, groove 444 receives oil only via oil hole 440. Since cross sectional plane A-A' does not pass through the oil hole, groove 444 in inset 420 may be completely surrounded by bore 438 and the portion of first end 250. Thus, groove 444 is not shown receiving oil from oil film between connecting rod bearing and crank journal in inset 420. It will be noted that groove 444 may serve as a reservoir of oil.

A first end of each of the internal conduits fluidically communicates with groove 444 and receives oil 470. Specifically, first end 488 of first internal conduit 282 in first flange 362 may fluidically communicate with and receive oil from groove 444. Similarly, first end 486 of second internal conduit 382 in second flange 364 may fluidically communicate with and receive oil from groove 444. The pressurized oil from groove 444 may flow within each of the internal conduits towards second end 260 of connecting rod 202. As shown in FIG. 4, each of the internal conduits spans the length of the connecting rod from groove 444 at the first end 250 of the connecting rod until substantially the second end 260.

An external nozzle may be fluidically coupled to a second end of each of the internal conduits. The second end of each of the internal conduits may be positioned substantially at the second end 260 of connecting rod 202. Specifically, since the second end 260 of the connecting rod 202 includes wrist pin 434, each external nozzle may be positioned below the wrist pin 434. In other words, each external nozzle may be positioned below bore 462 (also termed, wrist pin bore 462) at second end 260. In alternative embodiments, the second end of each of the internal conduits may be positioned substantially adjacent to the second end 260 of connecting rod 202.

Second end 487 of first internal conduit 282 may be fluidically coupled with external nozzle 458 while second end 485 of second internal conduit 382 may be fluidically coupled with external nozzle 456. As shown, external nozzles 458 and 456 may each be arranged below wrist pin 434 (or below wrist pin bore 462). However, external nozzle 458 may be positioned at a separate and different location relative to a position of external nozzle 456. In other words, external nozzle 458 may be positioned away from external nozzle 456, but each external nozzle may be arranged below wrist pin bore 462. Other positions of the external nozzle may be contemplated to provide unimpeded oil flow to the underside 290 of piston 36. Further, each of the external nozzles 458 and 456 may be positioned at (or adjacent) to the second end 260 of the connecting rod 202. In this way, each of the internal conduits within the flanges of the connecting rod fluidically couple groove 444 to respective external nozzles. Specifically, first internal conduit 282 fluidically couples groove 444 to external nozzle 458 while second internal conduit 382 fluidically couples groove 444 to external nozzle 456.

Each of the external nozzles may be formed of a material capable of withstanding conditions existing within a crankcase. For example, each nozzle may be made from a metal, a heat resistant polymer, or other materials known in the art. As such, each of the external nozzles may be fitted at the second end 260 of the connecting rod through a drilling (not indicated). For example, the drilling may include threads which mate with corresponding threads at an end of each external nozzle. Herein, each external nozzle may be threaded into connecting rod 202. The drillings may enable fluidic communication between each of the external nozzles and respective second ends of each internal conduit within the hollow flanges of the connecting rod. Other methods of coupling the external nozzles to their respective internal conduits may also be employed.

The depicted example shows a single external nozzle fluidically coupled to each internal conduit. To elaborate, first internal conduit 282 is fluidically coupled to one external nozzle 458 while second internal conduit 382 is depicted as fluidically coupled only to external nozzle 456. However, additional external nozzles may be fluidically coupled to each internal conduit without departing from the scope of this disclosure. For example, first internal conduit may be fluidically coupled to an additional external nozzle other than external nozzle 458. As depicted in FIG. 3, the first internal conduit 282 may be coupled to two external nozzles (458 and 358). In other words, each internal conduit of the connecting rod may supply oil to one or more external nozzles.

Further, each of the external nozzles may spray oil to a different location on the underside 290 of piston 36. Underside 290 of piston 36 may include base zone 465, a first side zone 467, and a second size zone 469. The external nozzles may be positioned at the second end 260 of the connecting rod in a manner which enables them to spray oil towards all zones of underside 290 of piston 36. The oil spray is depicted as dashed lines 473 in FIG. 4. As such, the external nozzles (and the drillings they are fitted in) may be positioned at a specific angle that allows a substantial portion of the oil spray 473 to reach base zone 465 of the piston. A smaller portion of oil spray 473 from each of the external nozzles may reach side zones of piston 36. For example, a smaller portion of oil sprayed from external nozzle 456 may reach (and cool) first side zone 467. Similarly, a smaller portion of oil sprayed from external nozzle 458 may reach (and cool) second side zone 469. Oil sprayed by external nozzle 456 may flow without obstruction from external nozzle 456 towards base zone 465 of piston 36. Similarly, oil sprayed by external nozzle 458 may flow without obstruction from the external nozzle 458 to base zone 465 of piston 36. Thus, a substantial amount of the oil sprayed by each nozzle may be received at the base zone 465 of piston 36. This oil spray may strike base zone 465 of piston 36 and then drip down towards oil sump within the crankcase. Similarly, the smaller portions of oil sprayed from each external nozzle may contact respective side zones of piston 36, provide cooling, and then drop down towards the oil sump within the crankcase.

In this manner, oil may be transferred continuously from the connecting rod bearing to the underside of the associated piston and may enable cooling of the piston throughout the extent of piston travel. Specifically, oil may be sprayed continuously via the one or more external nozzles coupled to the one or more internal conduits within the connecting rod towards the underside of the piston. By using oil already provided to the connecting rod bearings, parasitic loads on the oil pump may be reduced. Oil sprayed via the external nozzles may reach the piston underside including base zone and side zones of the underside of the piston continuously. The position of the piston in the cylinder (e.g., TDC, BDC, or therebetween) does not affect the reach of the oil spray since the external nozzles are positioned to deliver oil directly to the underside of the piston. Thus, the oil may be targeted specifically towards the underside of the piston. By cooling the piston, engine efficiency and performance may be enhanced.

An example system may thus comprise an engine including a cylinder, a piston reciprocating within the cylinder, a connecting rod coupling the piston to a crankshaft, a first end (e.g., big end) of the connecting rod including a first bore coupled to a crank pin of the crankshaft via a connecting rod bearing, a second end (e.g., small end) of the connecting rod including a second bore coupled to the piston via a wrist pin, a beam of the connecting rod spanning a distance from the first end of the connecting rod to the second end of the connecting rod, the beam comprising a web section, a first flange, and a second flange, wherein each of the first flange and the second flange is hollow, an internal groove formed on a portion of an inside circumference of the first bore, the internal groove adapted to receive oil from an oil hole on the connecting rod bearing, a first internal conduit within the first flange fluidically coupling the internal groove with a first external nozzle, the first external nozzle arranged at the second end of the connecting rod, and a second internal conduit within the second flange fluidically coupling the internal groove with a second external nozzle, the second external nozzle arranged at the second end of the connecting rod away from the first external nozzle. The first end of the connecting rod may include at least two bolt holes, each bolt hole positioned towards a lateral edge of the first end of the connecting rod. The internal groove may be formed away from each of the two bolt holes. Further, each of the first flange and the second flange may be circular. In another example, each of the first flange and the second flange may be oblong. Further still, each of the first external nozzle and the second external nozzle may be adapted to squirt oil towards an underside of the piston.

Turning now to FIG. 5, it shows a method 500 for cooling a piston according to the first embodiment of this disclosure described in FIGS. 3 and 4. The piston may be one of a plurality of pistons arranged within cylinders of an engine, such as engine 10 of FIGS. 2 and 3. Specifically, a portion of oil lubricating a connecting rod bearing and a crank journal interface may be transferred via internal conduits within the connecting rod towards the base of the associated piston. Further still, external nozzles coupled to the internal conduits may spray the oil towards an underside of the piston. Method 500 will be described in reference to FIGS. 3 and 4.

It will be noted that method 500 may not be activated nor performed by a controller, such as controller 12, and may instead occur due to the design of the system and its hardware including internal conduits, oil grooves, and external nozzles.

At 502, method 500 includes flowing oil from an oil gallery in the engine into one or more internal oil passages within the crankshaft. The internal oil passages may be drilled within the crankshaft and may extend, as described earlier, from a main bearing journal through an adjacent web and thereon into an adjacent crank journal. Next at 504, oil may flow onto the connecting rod bearing via an oil hole in the associated crank journal. This oil may lubricate the interface between the connecting rod bearing and the corresponding crank pin.

At 506, a portion of the oil in the interface between the connecting rod bearing and the corresponding crank pin may be transferred to a groove (such as groove 444 of FIG. 4) via an oil hole (such as oil hole 440 in FIG. 4) in the connecting rod bearing. The groove, as described earlier, at 508, may be carved into a portion of an inside circumferential surface of a bore (such as bore 438) at the first end (e.g., 250 of connecting rod 202) of each connecting rod in the engine. The inside circumferential surface (also termed, inside circumference 1020) of the bore at the big end of the connecting rod is shown in FIG. 10.

At 510, oil may flow from the groove into one or more internal conduits within the connecting rod. The one or more internal conduits may be positioned within hollow flanges of the connecting rod, as described earlier in reference to FIG. 4, and may be fluidically coupled to the groove. For example, in reference to connecting rod 202 of FIG. 4, the internal conduits may be first internal conduit 282 and second internal conduit 382. At 512, oil may flow through the one or more internal conduits of the connecting rod towards external nozzles arranged at the second end of the connecting rod. As described earlier in reference to FIG. 4, an external nozzle may be fluidically coupled to each internal conduit of the connecting rod. Further, at 514, the external nozzles (or simply termed, nozzles) may be positioned below the second bore of the connecting rod. The second bore may enable coupling between the connecting rod and the piston. As such, the external nozzles may be positioned below the wrist pin, wherein the wrist pin is arranged within the second bore.

Next, at 516, oil may be sprayed from the external nozzles towards the base (or underside) of the associated piston. Further, at 518, oil sprayed from the external nozzles may be received at the base zone and size zones of the underside of the piston, as shown by the dotted oil spray 473 in FIG. 4.

Thus, an example method may comprise delivering oil to an underside of a piston arranged within a cylinder of an engine via an internal conduit in a connecting rod of the piston, the internal conduit fluidically coupled at a first end to an external nozzle, the external nozzle located below a wrist pin bore of the connecting rod. The internal conduit may be disposed within a hollow flange of the connecting rod. As such, the connecting rod may include two hollow flanges and each hollow flange may include an internal conduit. A second end of the internal conduit may be fluidically coupled to a groove formed on an internal circumference of a first bore of the connecting rod, the first bore surrounding a connecting rod bearing. The groove may receive oil from the connecting rod bearing, while the connecting rod bearing may receive oil from an internal oil passage within a crankshaft. The internal oil passage within the crankshaft may receive oil from an oil gallery fluidically coupled to an oil pump. Further, delivering oil to the underside of the piston may include spraying oil to the underside of the piston via the external nozzle.

Referring now to FIG. 6, it schematically portrays a second embodiment for piston cooling. Engine 600 depicted in FIG. 6 may be considerably similar to engine 10 of FIG. 3 differing only in the oil delivery to cool the piston. However, each component will be further described below.

Engine 600, like engine 10, may be a four cylinder engine, with the four cylinders arranged in an inline manner. As such, engine 600 includes first cylinder 610, second cylinder 612, third cylinder 614, and fourth cylinder 616. Each of the four cylinders includes a piston 636 reciprocating within the cylinder. Further, each piston 636 may be coupled to crankshaft 640 via a respective connecting rod 602. It will be noted that each piston 636 of engine 600 may be similar. It will also be noted that each connecting rod 602 and its respective oil delivery assembly including exterior tube 604 may also be similar.

Crankshaft 640 has a crank nose end 630 (also termed front end) with crank nose 634 for mounting pulleys and/or for installing a harmonic balancer (not shown) to reduce torsional vibration. Crankshaft 640 further includes a flange end 615 (also termed rear end) with a flange 642 configured to attach to a flywheel (not shown). In the depicted example, crankshaft 640 includes a front main bearing journal 625 and a rear main bearing journal 627. In addition to these main bearing journals at the two ends (front and rear), crankshaft 640 further includes three main bearing journals 623, 621, and 619 positioned between front main bearing journal 625 and rear main bearing journal 627. Thus, crankshaft 640 has five main bearing journals wherein each main bearing journal is aligned with a central axis of rotation 655 of crankshaft 640.

Each connecting rod 602 of plurality of pistons 636 may be coupled to the crankshaft 640 at a corresponding crank journal (also termed, crank pin) via a corresponding connecting rod bearing (not shown). Crankshaft 640 has four crank pins, each labeled 622, and each crank pin 622 is supported by a first web 618 (or first cheek 618) and a second web 620 (or second cheek 620). As such, first web 618 and second web 620 may support the same crank pin and may be located at opposite ends of the crank pin.

Referring to FIG. 7, a perspective view of a single piston 636 coupled towards crank nose 634 (e.g., front end) of crankshaft 640 is shown. It will be noted that FIG. 7 does not include either the first embodiment or the second embodiment of piston cooling to provide a clearer view. Herein, connecting rod 602 couples piston 636 to a crank pin (not indicated) arranged between first cheek 618 and second cheek 620. Specifically, a first end 650 of connecting rod 602 is coupled to the crank pin arranged between first web 618 and second web 620. It will be appreciated that first end 650 of connecting rod 602 forms an interface (without face-sharing contact) with each of first web and second web. As shown in FIG. 7, first interface 724 may be formed between a thrust surface of first web 618 and a first thrust surface of first end 650 of connecting rod 602. The thrust surface of first web 618 may face, without directly contacting, the first thrust surface of first end 650 of connecting rod 602. A second interface 726 may be formed between a thrust surface of second web 620 and a second thrust surface of first end 650 of connecting rod 602. The thrust surface of second web 620 may face, without directly contacting, the second thrust surface of first end 650 of connecting rod 602. Further description of the interfaces will be provided below.

It will be noted that a first clearance may exist between the thrust surface of first web 618 and the first thrust surface of first end 650 of connecting rod 602. Similarly, a second clearance may exist between the thrust surface of second web 620 and the second thrust surface of first end 650 of connecting rod 602. Each of the clearances may be sized to be large enough to allow smooth movement of the connecting rod. As such, a tighter clearance may cause binding of the connecting rod.

Returning now to FIG. 6, each crank pin 622 may be supported by a corresponding first web 618 and second web 620. Each of the webs (e.g. first web 618 and second web 620) may further couple each of the crank pins to adjacent main bearing journals. To elaborate, in the example of first cylinder 610, first web 618 may couple crank pin 622 to front main bearing journal 625 whereas second web 620 may couple crank pin 622 to main bearing journal 623. Similarly, in the example of second cylinder 612, first web 618 may couple associated crank pin 622 to main bearing journal 623 while second web 620 may couple the associated crank pin 622 to main bearing journal 621.

Engine 600 may receive lubrication from lubrication system 690 which includes oil pump 681 which may be fluidically coupled to oil gallery 603. Further, oil pump 681 pumps oil from an oil sump (not shown) within a crankcase to the oil gallery 621. Oil gallery 603 supplies oil 670 under pressure to multiple components of the engine 600 including crankshaft 640, one or more camshafts and related components including rocker arms, lifters, etc., and components of a turbocharger system. Specifically, oil 670 may be delivered via passages in an engine block to multiple oil passages drilled into crankshaft 640. As shown in FIG. 6, oil 670 may be delivered to each main bearing journal of crankshaft 640 via a supplementary conduit 648.

An internal oil passage 646 is drilled within each main bearing journal and is also fluidically coupled to a corresponding supplementary conduit 648. Thus, each internal oil passage 646 receives oil via its corresponding supplementary conduit 648 from oil gallery 603. Further, each internal oil passage 646 may extend from its associated main bearing journal through a neighboring (e.g., adjacent) web of the crankshaft into a crank pin. For example, in reference to first cylinder 610, internal oil passage 646 in front main bearing journal 625 extends from front main bearing journal 625 through adjacent first web 618 into crank journal 622 associated with first cylinder 610. In another example, in reference to third cylinder 614, internal oil passage 646 receives oil from its respective supplementary conduit 648 into main bearing journal 619 and conducts the oil to adjacent crank journal 622 via adjacent second web 620.

Bearings coupled to each of the main bearing journals and the crank journals may thus be lubricated. Specifically, an oil hole may be formed on each crank journal and main bearing journal to transfer oil from the internal oil passage 646 to a connecting rod bearing and/or a main bearing. As such, oil may flow through the journal into a corresponding bearing and may form an oil film between the journal and its corresponding bearing providing lubrication. Oil may be continuously forced through the various bearings of the crankshaft. Further, oil may be cast outward from each bearing as oil exits the bearing and may fall down (as shown by oil drops 694) into the oil sump in the crankcase. However, in the second embodiment for piston cooling described herein, a portion of the oil exiting each connecting rod bearing and crank journal may be trapped and then transferred towards the base of the associated piston. Specifically, oil thrown out from the connecting rod bearing and crank journal interface may be trapped in an annular groove formed on the thrust interface of at least one web adjacent to a corresponding crank journal. It will be noted that oil containing sections such as oil gallery 603, internal passage 646, oil drops 694, etc. are shown as dotted regions.

Inset 680 depicts a magnified view of an interface between a crank journal and an adjacent (or neighboring) web. For example, the magnified view in inset 680 may include front main bearing journal 625, adjacent first cheek 618, adjacent crank pin 622, and a corresponding first end 650 (e.g., big end 650) of connecting rod 602 coupled to piston 636 in first cylinder 610. Inset 680, however, does not show piston 636, first cylinder 610, or the full extent of connecting rod 602. As such, inset 680 depicts transfer of oil from the connecting rod bearing and crank pin interface to an exterior tube 604 coupled to connecting rod 602 according to the second embodiment of the present disclosure.

A portion of oil cast out from the connecting rod bearing and crank journal may be trapped in first annular groove 682. First annular groove 682 may be formed on a thrust surface 658 of first web 618. It will be noted that inset 680 depicts first annular groove 682 formed on a protrusion of first web 618. The protrusion is depicted for providing clarity of the thrust surface 658 of first web 618, and as such the protrusion may not exist (or be formed) on the first web 618. First annular groove 682 on first web 618 may be formed as a circle around a joint between crank pin 622 and first web 618.

Figure 9:
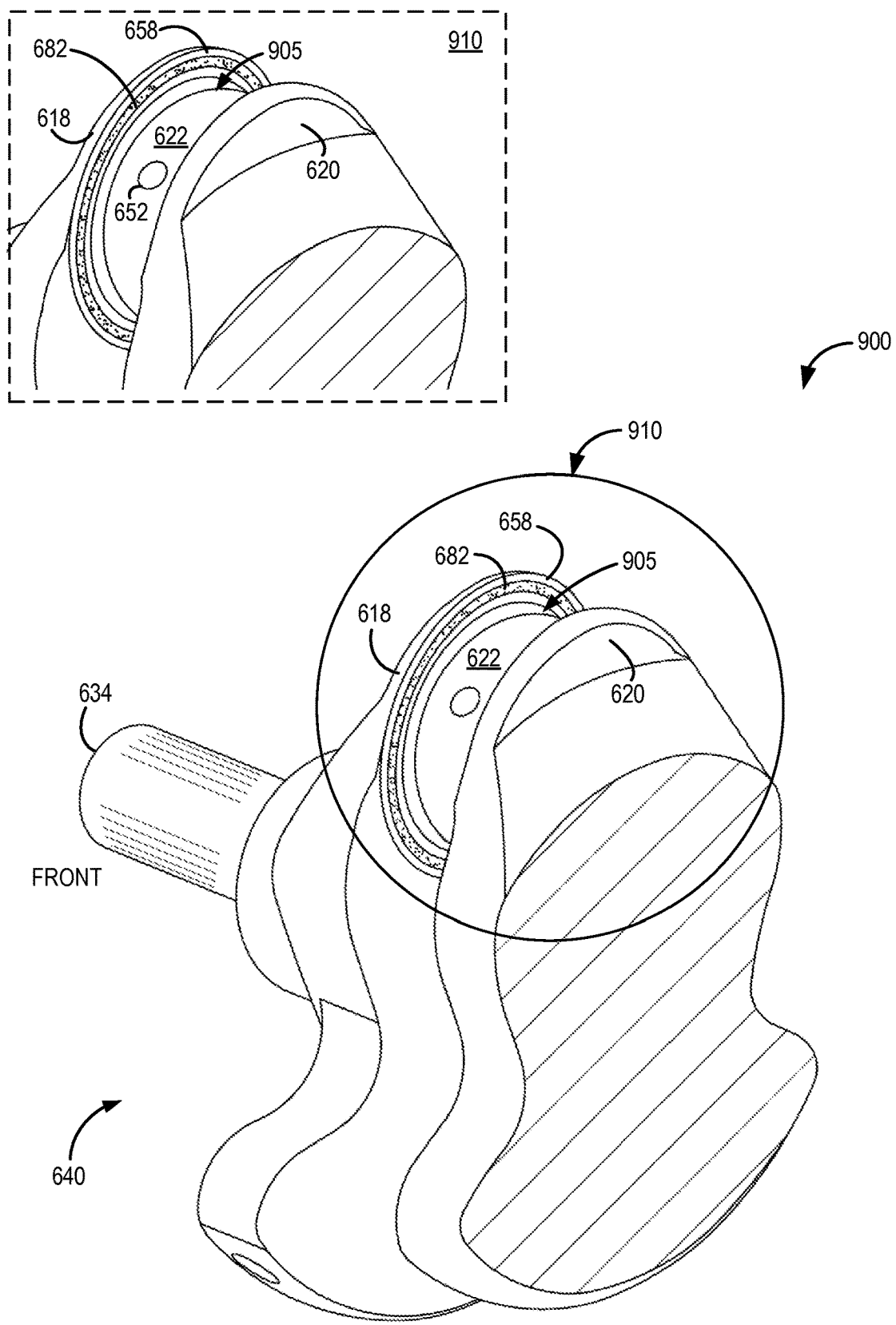
FIG. 9 shows an annular groove containing oil formed on a cheek of the crankshaft adjacent to a crank pin.

Referring to FIG. 9, it shows a perspective view 900 of a single crank pin 622 positioned between first web 618 and second web 620 towards crank nose 634 (e.g., front end) of crankshaft 640 is shown. As will be noted, the piston and connecting rod are not shown to assist in describing the position of first annular groove 682 on first web 618.

First annular groove 682 (shown as a dotted annular region) on first web 618 may be formed on thrust surface 658 of first web 618. Further, first annular groove 682 may be fashioned as a ring around a joint 905 between crank pin 622 and thrust surface 658 of first web 618. As such, the first annular groove may encircle joint 905. Inset 910 depicts a magnified view of the thrust surface 658 of first web 618 including crank pin 622. Further, first annular groove 682 formed on thrust surface 658 on first web 618 may collect oil that may be cast out of an interface formed between crank pin 622 and a corresponding connecting rod bearing (not shown). As described earlier in reference to FIG. 6, oil may flow from an internal oil passage 646 (shown in FIG. 6) in crankshaft 640 to crank journal 622. Furthermore, oil may exit crank pin 622 via oil hole 652 (indicated in inset 910 of FIG. 9) in crank pin 622, and may spread between the connecting rod bearing and the crank pin (e.g., within the interface formed between connecting rod bearing and crank journal).

Returning now to inset 680 of FIG. 6, oil collected in first annular groove 682 may be transferred to a second annular groove 684 formed at first end 650 of connecting rod 602. For example, the second annular groove 684 may be produced encircling a bore (e.g., bore coupled to connecting rod bearing) at the first end of the connecting rod. Further still, second annular groove 684 may be formed on a first thrust surface 654 of first end 650 of connecting rod 602. The first annular groove 682 may be adjacent to (e.g. proximal) the second annular groove 684.

As shown in inset 680, thrust surface 658 of first web 618 may be adjacent to and may face the first thrust surface 654 of first end 650 of connecting rod 602. As such, thrust surface 658 of first web 618 may be a mating surface for the first thrust surface 654 of first end 650 of connecting rod 602. However, a clearance may exist between thrust surface 658 of first web 618 and the first thrust surface 654 of first end 650 of connecting rod 602. As explained earlier, this clearance may be wide enough to enable smooth movement of the connecting rod such that the connecting rod does not wear or seize. However, the clearance may also be sufficiently narrow to enable a transfer of oil from the first annular groove 682 to the second annular groove 684. As such, transfer of oil from the first annular groove 682 and the second annular groove 684 may occur due to oil pressure. Further still, first annular groove 682 and second annular groove 684 may be formed directly across from each other such that oil in the first annular groove can transfer in an unobstructed manner into the second annular groove. Specifically, the first annular groove 682 and the second annular groove 684 may be formed at substantially similar radii relative to an outer diameter of corresponding crank journal 622. In other words, first annular groove 682 and second annular groove 684 may face each other and may have a substantially small clearance therebetween to enable oil contained within first annular groove 682 to be transferred to second annular groove 684.

First end 650 of connecting rod 602 also includes an internal channel 686 fluidically coupled to the second annular groove 684. Internal channel 686 may be drilled into the first end 650 of the connecting rod. As such, internal channel 686 fluidically couples the second annular groove 684 to an exterior tube 604. A first end of the exterior tube 604 may be coupled to the internal channel 686. As such, the exterior tube may extend from the first end 650 of the connecting rod to the second end 660 of the connecting rod, as shown in FIG. 6.

The exterior tube 604 may be a lightweight tube made of a material that can withstand the conditions in the crankcase of engine 600. As an example, exterior tube 604 may be manufactured from a lightweight metal such as aluminum, or from a polymeric material. Exterior tube 604 may be attached to an external surface of a beam of connecting rod 602 along a length of the connecting rod. As described earlier in reference to FIG. 4, the beam of the connecting rod includes an extent of the connecting rod between the first end 650 and the second end 660. In one example, exterior tube 604 may be mechanically coupled via straps. In another example, exterior tube 604 may be attached to the connecting rod via adhesives. Other joining methods (e.g., welding) may also be used to couple the exterior tube 604 to the connecting rod.

FIG. 10 depicts a perspective view of an entire length of connecting rod 602 according to the second embodiment with exterior tube 604 coupled to the connecting rod. Connecting rod 602 may be coupled to crank pin 622 of FIG. 9 such that first end 650 of connecting rod 602 is positioned between first web 618 and second 620 of crankshaft 640. The exterior tube 604 is an external attachment to the connecting rod 602, and unlike the first embodiment, may be a distinct component from the connecting rod. Further, the exterior tube 604 is coupled along a substantial length of the connecting rod 602. For example, the exterior tube may extend from first end 650 of the connecting rod until the second end 660 of the connecting rod 602. Other lengths of the exterior tube may be selected based on the piston and connecting rod.

FIG. 11 shows a magnified perspective view 1100 of first end 650 of connecting rod 602 in FIG. 10. Referring to each of FIGS. 10 and 11, first end 650 of connecting rod 602 includes bore 1038 (similar to bore 438 of FIG. 4). Bore 1038 may encircle a connecting rod bearing (not shown) which in turn may surround a crank pin. Further, as mentioned earlier, an oil layer may exist between the connecting rod bearing and the crank pin. The connecting rod bearing may be positioned within the inside circumference 1020 of bore 1038. The first end 650 of connecting rod includes second annular groove 684 which may be formed around bore 1038. Second annular groove 684 is depicted as a ring around bore 1038 and may receive oil from first annular groove 682 formed on a mating surface of the adjacent first web 618, as described earlier in reference to FIG. 6. Second annular ring 684 may also contain oil, indicated by dotted region, within second annular groove 684. Internal channel 686 may be fluidically coupled to the second annular groove 684, as shown at 1058. As such, internal channel 686 may be formed as two separate conduits, a first conduit 688 and a second conduit 689. Each of the first conduit 688 and the second conduit 689 may be drilled into the first end 650 of the connecting rod 602 at the depicted location. Since internal channel 686 is arranged internally within connecting rod 602, internal channel 686, including each of first conduit 688 and second conduit 689, is depicted by dashed lines. In one example, the internal channel 686 may be formed into lateral edge 1054, as depicted in FIGS. 10 and 11. In an alternate embodiment, internal channel 686 may be formed into lateral edge 1052 located opposite to lateral edge 1054. In yet another embodiment, the connecting rod may include an internal channel formed on each lateral edge. Thus, internal channel 686 may be formed by drilling into the first end 650 of the connecting rod 602.

As shown in magnified perspective view 1100 of FIG. 11, first conduit 688 of internal channel 686 is fluidically coupled to second annular groove 684 at 1058. Further, second conduit 689 of internal channel 686 is fluidically coupled to exterior tube 604. Further still, first conduit 688 of internal channel 686 is fluidically coupled to second conduit 689 of internal channel 686. As such, first conduit 688 of internal channel 686 may receive oil from second annular groove and transfer this oil to second conduit 689 of internal channel 686. Accordingly, each of the second annular groove 684, first conduit 688 of internal channel 686, second conduit 689 of internal channel 686, and exterior tube 604 are shown filled with dots, indicating the presence of oil.

Oil in second annular groove may, thus, be conducted through internal channel 686 (specifically, through each of first conduit 688 and second conduit 689) into the exterior tube 604. Thus, in the depicted example, the second annular groove 684 may be fluidically coupled to exterior tube 604 via two intersecting conduits formed by drilling: first conduit 688 of internal channel 686 and second conduit 689 of internal channel 686. In one example, first conduit 686 may be arranged perpendicular to second annular groove 684. In other words, first conduit 688 of internal channel 686 may be positioned parallel to central axis of rotation 655 of crankshaft 640. Meanwhile, second conduit 689 of internal channel 686 may be arranged parallel to a longitudinal axis of connecting rod 602, the longitudinal axis being parallel to a beam of connecting rod 602 as defined earlier in respect to FIG. 4 for connecting rod 202. In other words, second conduit 689 of internal channel 686 may be positioned substantially perpendicular to first conduit 688 of internal channel 686. Other positions of the first conduit and second conduit of internal channel 686 may be considered, without departing from the scope of this disclosure. As such, the second conduit 689 may be positioned to enable fluidic coupling with first end 1032 of exterior tube 604.

Referring to FIGS. 6, 9, 10, and 11, it will be appreciated that the depicted second embodiment for piston cooling includes the first annular groove 682 on the first web 618 and the second annular groove 684 on the first thrust surface 654 of the first end 650 of the connecting rod 602. Herein, the first thrust surface 654 of the first end 650 of the connecting rod 602 is adjacent to and faces thrust surface 658 of the first web 618. In other examples, an additional annular groove may be formed on the thrust surface of the second web 620 (not shown). Further, a corresponding mating annular groove (similar to second annular groove 684) may be formed on the second thrust surface 656 of the first end 650 of the connecting rod 602. As shown in FIG. 10, second thrust surface 656 may face away from the viewer towards the page. Further, the first thrust surface 654 of the first end 650 of the connecting rod 602 may lie opposite to, and parallel to, the second thrust surface 656 of the first end 650 of the connecting rod 602. As such, the second thrust surface 656 of the first end 650 of the connecting rod 602 may be adjacent to the second web 620. Furthermore, in this example with the additional annular grooves, supplementary internal channels may also be drilled into the first end 650 of the connecting rod to fluidically couple an additional exterior tube to the additional annular grooves.

It will be noted that each of the annular grooves may not be sealed. The annular groove on the cheek of the crankshaft receives oil that is cast away from the interface formed between the adjoining connecting rod bearing and its corresponding crank journal.

Returning now to FIG. 6, each piston 636 arranged within the four cylinders of engine 600 is cooled via oil received from exterior tube 604. As described earlier, exterior tube 604 coupled to an exterior of the connecting rod is in fluidic communication with second annular groove 684 at the first end 650 of the connecting rod 602. Oil is sprayed (shown as dashed lines) from an outlet of exterior tube 604 towards an underside 692 of piston 636. The outlet of the exterior tube 604 may be positioned adjacent to the second end 660 of the connecting rod 602.

Figure 8:
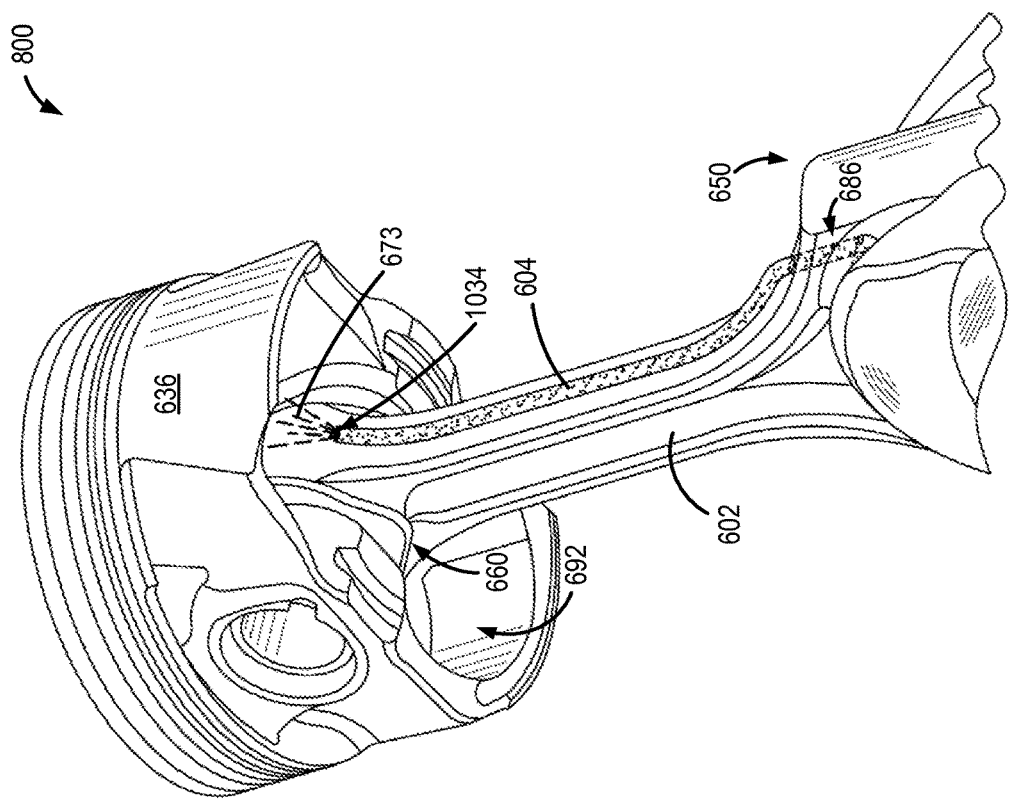
FIG. 8 portrays a perspective view of piston cooling via an exterior tube according to the second embodiment of the present disclosure.

FIG. 8 shows an underside 692 of piston 636. Further, FIG. 8 depicts exterior tube 604 coupled along the length of the connecting rod. Only a portion of internal channel 686 is shown in FIG. 8. However, FIG. 8 shows a spray 673 of oil (dashed lines) exiting outlet 1034 of the exterior tube 604 towards the underside 692 of the piston 636. Though not shown specifically, oil spray 673 exiting outlet 1034 of exterior tube 604 may reach and strike a base of piston 636. As described earlier in reference to FIG. 4, the underside 290 of piston 36 may include a base zone and side zones. Similarly, underside 692 of piston 636 may include a base zone and side zones. Thus, oil spray 673 may reach, contact, and cool the base zone and side zones of piston 636.

Further still, the outlet 1034 of the exterior tube 604 may be positioned such that a substantial portion of oil exiting the outlet of the exterior tube flows in an unobstructed manner towards underside 692 of piston 636. To elaborate, oil may flow from outlet 1034 of exterior tube 604 without obstruction towards the base and sides (included in the underside) of the piston. Oil may then drip down towards the oil sump within the crankcase (not shown).

Referring now to FIG. 10, first end 1032 of exterior tube 604 is fluidically coupled to the internal channel 686. Further, a second end 1036 of the exterior tube 604 is arranged adjacent to the second end 660 of the connecting rod. As such, the second end 1036 of the exterior tube may be positioned at about the same height as bore 662 in the second end 660 of the connecting rod. In another example, second end 1036 and outlet 1034 of the exterior tube may be lower than the bore 662 at the second end of the connecting rod 602. The length of exterior tube 604 and position of the second end 1036 and outlet 1034 of the exterior tube 604 may be selected to provide substantial oil spray onto the underside of the corresponding piston 636. Piston 636 may be coupled to connecting rod 602 via a wrist pin arranged within bore 662 at second end 660 of connecting rod 602. Second end 1036 of exterior tube 604 may be angled in a specific direction to provide oil to the base zone on the underside of the piston. A smaller portion of oil spray 673 may be directed towards side zones of the underside 692 of piston 636. Upon striking the underside of piston 636, oil from oil spray 673 may fall down into the oil sump.

Alternative embodiments may have a different position for the second end 1036 and outlet 1034 of the exterior tube 604 to ensure that a significant portion of oil is delivered onto the underside of the piston 636.

Thus, a piston may be cooled via an exterior tube attached along a length of a corresponding connecting rod. As such, oil that may be cast out from a connecting rod bearing and crank journal interface may be collected by an annular groove, such as a first annular groove 682, on an adjoining web of the crankshaft. This trapped oil may be transferred from the first annular groove on the cheek of the crankshaft to a mating annular groove (e.g., annular groove 684) on a thrust surface at a first end of the connecting rod (e.g., thrust surface 654). The oil may then be conducted via an internal channel in the connecting rod to an exterior tube attached along an exterior of the connecting rod. As such, the internal channel enables fluidic coupling between the exterior tube and the annular groove on the first end of the connecting rod. The exterior tube may transfer the oil towards a base of the piston (also termed base zone located on the underside of the piston). Further, due to the pressure of the oil, oil may be sprayed from an outlet of the exterior tube towards the base of the piston. This oil may enable cooling of the piston via conduction.

Thus, an example system may comprise a connecting rod with an internal channel at a first end of the connecting rod, a first annular groove formed at the first end of the connecting rod, a cheek of a crankshaft adjacent to the first end of the connecting rod, and a second annular groove formed on the cheek of the crankshaft, the second annular groove adjacent to the first annular groove. The example system may further comprise an exterior tube coupled to the connecting rod, wherein a first end of the exterior tube may be fluidically coupled to the first annular groove via the internal channel. The first end of the connecting rod may include a first bore, the first bore surrounding a connecting rod bearing. Further, the connecting rod bearing may be coupled to a crank arm of the crankshaft. The second annular groove formed on the cheek of the crankshaft may be adapted to receive oil from the connecting rod bearing. Further still, the first annular groove may be adapted to receive oil from the second annular groove. The system may further comprise a piston reciprocating within a cylinder of an engine, the piston coupled to the connecting rod. A second end of the connecting rod may be coupled to the piston via a piston pin. Further, a second end of the exterior tube may be positioned underneath a base of the piston. Herein, the exterior tube may be adapted to transfer oil from the first annular groove, and wherein the second end of the exterior tube is adapted to spray oil towards the base of the piston.

Turning now to FIG. 12, it shows an example method 1200 for cooling a piston according to the second embodiment of this disclosure described in reference to FIGS. 6, 7, 8, 9, 10, and 11. The piston may be one of a plurality of pistons arranged within cylinders of an engine, such as engine 600 of FIG. 6. Specifically, a portion of oil lubricating a connecting rod bearing and a crank journal interface may be captured by a first annular groove formed on a cheek of a crankshaft in the engine. This trapped oil may be transferred to a second annular groove formed on a first end of an adjoining connecting rod. An exterior tube coupled to the connecting rod may be fluidically coupled to the second annular groove and may receive the oil. This oil may be conducted towards the base of the associated piston. Further still, the exterior tube may spray the oil towards the base of the piston. Method 1200 will be described in reference to FIGS. 6-10.

It will be noted that method 1200 may not be activated nor performed by a controller, such as controller 12, and may instead occur due to the design of the system and its hardware including annular grooves, internal channels, and exterior tubes.

At 1202, method 1200 includes flowing oil from an oil gallery in the engine into one or more internal oil passages within the crankshaft. The internal oil passages may be drilled within the crankshaft and may extend, as described earlier, from a main bearing journal through an adjacent web and thereon into an adjacent crank journal. Next at 1204, oil may flow into the connecting rod bearing via an oil hole (e.g., oil hole 652) in the associated crank journal. This oil may lubricate the interface between the connecting rod bearing and the corresponding crank pin.

At 1206, oil is received into a first annular groove on a cheek of the crankshaft adjoining the connecting rod bearing and the corresponding crank pin. As such, oil in the interface between the connecting rod bearing and the corresponding crank pin may be flung out during engine operation. Further, at 1208, this oil may be trapped in the first annular groove. Oil in the first annular groove may be transferred, at 1210, to a second annular groove carved around a bore at a first end of the connecting rod. The connecting rod may be coupled to the crank pin adjoining the cheek of the crankshaft with the first annular groove. As such, the first annular groove and the second annular groove may be adjacent to each other. Further, the bore at the first end of the connecting rod may be coupled to the crank pin via the connecting rod bearing.

Next, at 1212, oil in the second annular groove flows through an internal channel (such as internal channel 686 in FIGS. 6, 10, and 11) formed within the first end of the connecting rod. Oil flows via the internal channel into an exterior tube, e.g., exterior tube 604 of FIG. 6. The exterior tube may be arranged along a substantial length of the connecting rod, at 1214. Further still, the exterior tube fluidically communicates with the second annular groove via the internal channel.

At 1216, oil is conducted through the exterior tube from a first end of the exterior tube (such as first end 1032 of exterior tube 604) to a second end of the exterior tube, such as second end 1036 of exterior tube 604. The second end of the exterior tube may be positioned underneath a base (e.g., base zone) of the piston coupled to the connecting rod.

At 1218, oil is sprayed from the second end of the exterior tube towards an underside of the piston. As such, oil is sprayed from an outlet of the exterior tube, such as outlet 1034 at the second end 1036 of exterior tube 604. The oil may be directed towards base zone and side zones located on the underside of the piston.

At 1220, oil sprayed out of the second end of the exterior tube is received at the underside of the piston enabling cooling of the piston.

In this way, by cooling piston in an engine via oil received from connecting rod bearings and crank journals, a technical effect of downsizing an oil pump may be achieved. Another technical effect may be more effective cooling of the piston as the piston is cooled continuously during its travel from bottom dead center position to top dead center position and back. By cooling the piston continuously, piston degradation may be reduced. Overall, engine efficiency and performance may be improved.

In another representation, a connecting rod may comprise an internal conduit extending substantially from an inside circumference of a first bore of the connecting rod through a flange of the connecting rod to an external oil injector (also termed, an external nozzle), the external oil injector positioned below a second bore of the connecting rod, the first bore encircling a connecting rod bearing and the second bore encircling a wrist pin.

In yet another representation, an example system may comprise an engine with a cylinder, a piston reciprocating within the cylinder, the piston coupled to a connecting rod, and a hollow flange of the connecting rod fluidically coupled to an external oil nozzle at a first end, the oil nozzle positioned beneath an underside of the piston.

In still another representation, a system may comprise an engine with a cylinder, a piston reciprocating within the cylinder, a connecting rod, a first end of the connecting rod including a first bore, the first bore coupled to a crank pin of a crankshaft, a second end of the connecting rod coupled to the piston via a wrist pin, a first annular groove formed around the first bore on a thrust surface of the first end of the connecting rod, a cheek of the crankshaft adjacent to the thrust surface of the first end of the connecting rod, a second annular groove formed on a thrust surface of the crank cheek, the second annular groove positioned adjoining the first annular groove, an external tube coupled to an exterior of the connecting rod along a length of the connecting rod, a first end of the external tube fluidically coupled to the first annular groove via an internal conduit formed towards the first bore of the connecting rod, and a second end of the tube positioned below an underside of the piston. The system may further comprise a connecting rod bearing positioned between the first bore of the connecting rod and the crank pin of the crankshaft, the connecting rod bearing surrounding the crank pin and including an oil hole. The system may also include a crankcase positioned beneath the crankshaft, the crankcase including an oil sump. Further still, the system may comprise an oil pump for pumping oil from the oil sump to the crankshaft. The second annular groove may be adapted to receive oil from the connecting rod bearing, and the first annular groove may be adapted to receive oil from the second annular groove. The first end of the external tube may be adapted to receive oil from the first annular groove via the internal conduit, and the second end of the external tube may deliver oil to the underside of the piston. Further, the internal conduit may be formed via drilling.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
continuously delivering oil to an underside of a piston arranged within a cylinder of an engine via an internal conduit in a connecting rod of the piston through a plurality of piston positions including a top-dead-center position, a bottom-dead-center position, and each piston position therebetween, the internal conduit fluidically coupled at a first end to an external nozzle, the external nozzle located below a wrist pin bore of the connecting rod and between at least two wrist pin bore rotational connections.

2. The method of claim 1, wherein the internal conduit is disposed within a first hollow flange of the connecting rod, the first hollow flange joined to a second hollow flange of the connecting rod via a web portion of a beam of the connecting rod, the beam forming the first hollow flange, the second hollow flange, and the web portion and spanning a distance from a first end of the connecting rod to a second end of the connecting rod.

3. The method of claim 2, wherein a second end of the internal conduit is fluidically coupled to a groove formed on a portion of an internal circumference of a first bore of the connecting rod and not on an entirety of the internal circumference, the internal conduit spanning a length of the connecting rod from the groove toward the second end of the connecting rod, the first bore surrounding a connecting rod bearing, and the groove forming an oil reservoir.

4. The method of claim 3, wherein the groove continuously receives oil from the connecting rod bearing for each piston position of the plurality of piston positions, and wherein the connecting rod bearing continuously receives oil from an internal oil passage within a crankshaft, and wherein the internal oil passage within the crankshaft receives oil from an oil gallery fluidically coupled to an oil pump.

5. The method of claim 1, wherein delivering oil to the underside of the piston includes continuously spraying oil to the underside of the piston via the external nozzle.

6. A system, comprising:
an engine including a cylinder;
a piston reciprocating within the cylinder;
a connecting rod coupling the piston to a crankshaft;
a first end of the connecting rod including a first bore coupled to a crank pin of the crankshaft via a connecting rod bearing;
a second end of the connecting rod including a second bore coupled to the piston via a wrist pin;
a beam of the connecting rod spanning a distance from the first end of the connecting rod to the second end of the connecting rod, the beam comprising a web section bordered by a first flange and a second flange, wherein each of the first flange and the second flange is hollow;
an internal groove formed on a portion of an inside circumference of the first bore, the internal groove adapted to receive oil only from an oil hole on the connecting rod bearing;
a first internal conduit within the first flange fluidically coupling the internal groove with a first external nozzle, the first external nozzle arranged at the second end of the connecting rod; and
a second internal conduit within the second flange fluidically coupling the internal groove with a second external nozzle, the second external nozzle arranged at the second end of the connecting rod away from the first external nozzle,
where the first internal conduit and the second internal conduit each span a length of the connecting rod from the internal groove toward the second end.

7. The system of claim 6, wherein the first end of the connecting rod includes at least two bolt holes, each bolt hole positioned towards a lateral edge of the first end of the connecting rod.

8. The system of claim 7, wherein the internal groove is formed away from each of the two bolt holes.

9. The system of claim 8, wherein each of the first flange and the second flange is circular.

10. The system of claim 8, wherein each of the first flange and the second flange is oblong.

11. The system of claim 8, wherein each of the first external nozzle and the second external nozzle is adapted to squirt oil towards an underside of the piston.

12. A system, comprising: a connecting rod with an internal channel at a first end of the connecting rod; a first annular groove formed on a first thrust surface at the first end of the connecting rod, the first annular groove completely encircling a bore of the connecting rod; a cheek of a crankshaft adjacent to the first end of the connecting rod; and a second annular groove formed on a second thrust surface at the cheek of the crankshaft, the second annular groove adjacent to the first annular groove and completely encircling a joint between the crankshaft and the second thrust surface, the second thrust surface adjacent to the first thrust surface and facing the first thrust surface; wherein the second annular groove formed on the cheek of the crankshaft is adapted to receive oil from the connecting rod bearing, and wherein the first annular groove is adapted to receive oil from the second annular groove.

13. The system of claim 12, further comprising an exterior tube coupled to an exterior of the connecting rod along a length of the connecting rod, a first end of the exterior tube fluidically coupled to the first annular groove via the internal channel.

14. The system of claim 13, wherein the first end of the connecting rod includes the bore, the bore surrounding a connecting rod bearing.

15. The system of claim 14, wherein the connecting rod is coupled to a crank arm of the crankshaft via the connecting rod bearing.

16. The system of claim 15, wherein the first annular groove receive oil from the second annular groove through a clearance formed between the first annular groove and the second annular groove, the first annular groove facing the second annular groove directly across the clearance.

17. The system of claim 16, further comprising a piston reciprocating within a cylinder of an engine, the piston coupled to the connecting rod.

18. The system of claim 17, wherein a second end of the connecting rod is coupled to the piston via a piston pin.

19. The system of claim 18, wherein a second end of the exterior tube is positioned underneath a base of the piston.

20. The system of claim 19, wherein the exterior tube is adapted to transfer oil from the first annular groove, and wherein the second end of the exterior tube is adapted to spray oil towards the base of the piston.

* * * * *